United States Patent
Iska et al.

(10) Patent No.: US 10,877,947 B2
(45) Date of Patent: Dec. 29, 2020

(54) DEDUPLICATION OF METADATA FOR PLACES

(71) Applicant: SafeGraph, Inc., San Francisco, CA (US)

(72) Inventors: Kaushik Iska, San Carlos, CA (US); Noah Yonack, San Francisco, CA (US); Tenzing Shaw, San Francisco, CA (US); Andrew Israel, San Francisco, CA (US); Takashi Yonebayashi, San Francisco, CA (US); Piotr W. Kozikowski Kruczkowska, Oakland, CA (US); Aaron Goebel, San Francisco, CA (US)

(73) Assignee: SafeGraph, Inc., San Francisco, CA (US)

( * ) Notice: Subject to any disclaimer, the term of this patent is extended or adjusted under 35 U.S.C. 154(b) by 61 days.

(21) Appl. No.: 16/216,930

(22) Filed: Dec. 11, 2018

(65) Prior Publication Data
US 2020/0183900 A1  Jun. 11, 2020

(51) Int. Cl.
*G06F 16/00* (2019.01)
*G06F 16/215* (2019.01)
(Continued)

(52) U.S. Cl.
CPC .......... *G06F 16/215* (2019.01); *G06F 16/908* (2019.01); *G06F 17/18* (2013.01);
(Continued)

(58) Field of Classification Search
CPC .... G06F 16/215; G06F 16/908; G06F 40/232; G06F 17/18; G06K 9/6215;
(Continued)

(56) References Cited

U.S. PATENT DOCUMENTS 9,602,674 B1 * 3/2017 Polega .................... G06Q 50/26
10,489,387 B1 * 11/2019 Rogynskyy ........... G06F 16/178
(Continued)

FOREIGN PATENT DOCUMENTS

| KR | 10-2013-0082582 A | 7/2013 |
| KR | 10-2015-0112138 A | 10/2015 |
| WO | 2020040799 A1 | 2/2020 |

OTHER PUBLICATIONS

PCT/US2018/066894—International Search Report and Written Opinion dated Sep. 6, 2019, 9 pages.
(Continued)

*Primary Examiner* — Shiow-Jy Fan
(74) *Attorney, Agent, or Firm* — Haynes Beffel & Wolfeld, LLP; Ernest J. Beffel, Jr.; Sikander Khan

(57) ABSTRACT

The technology disclosed uses machine learning-based models to compare and merge metadata profiles from various metadata sources to create a library of metadata profiles with the most accurate attributes. The technology disclosed adjusts the geospatial coordinates of places located inside a building structure for accuracy and defines a block for each place within the perimeter of the building structure. The building structure may host a single place or multiple places. The non-overlapping blocks, the adjusted geospatial coordinates of places and more accurate metadata profiles enable the gathering of accurate location-specific data from visitors inside the building structures through their personal devices.

19 Claims, 15 Drawing Sheets

(51) Int. Cl.
*G06F 16/908* (2019.01)
*G06N 3/08* (2006.01)
*G06K 9/62* (2006.01)
*G06F 17/18* (2006.01)
*G06N 3/04* (2006.01)
*G06F 40/232* (2020.01)

(52) U.S. Cl.
CPC ......... *G06F 40/232* (2020.01); *G06K 9/6215* (2013.01); *G06K 9/6218* (2013.01); *G06K 9/6256* (2013.01); *G06K 9/6282* (2013.01); *G06N 3/04* (2013.01); *G06N 3/084* (2013.01)

(58) Field of Classification Search
CPC .. G06K 9/6218; G06K 9/6256; G06K 9/6282; G06N 3/04; G06N 3/084
See application file for complete search history.

(56) References Cited

U.S. PATENT DOCUMENTS

| | | |
|---|---|---|
| 2004/0008225 A1 | 1/2004 | Campbell |
| 2007/0265781 A1 | 11/2007 | Nemethy et al. |
| 2009/0327314 A1 | 12/2009 | Kim et al. |
| 2012/0162225 A1 | 6/2012 | Yang et al. |
| 2012/0166403 A1 | 6/2012 | Kim et al. |
| 2012/0166611 A1 | 6/2012 | Kim et al. |
| 2012/0316963 A1 | 12/2012 | Moshfeghi |
| 2013/0342565 A1 | 12/2013 | Sridhara et al. |
| 2014/0304262 A1 | 10/2014 | Makki et al. |
| 2015/0149659 A1* | 5/2015 | Emadzadeh ........ H04L 67/1021 709/247 |
| 2017/0031920 A1* | 2/2017 | Manning ................ G06F 16/435 |
| 2017/0052958 A1* | 2/2017 | Manning ................ G06F 16/35 |
| 2017/0351717 A1* | 12/2017 | Kabra .................... G06F 16/217 |
| 2018/0129938 A1* | 5/2018 | Xiong ...................... G06N 3/08 |
| 2018/0182381 A1* | 6/2018 | Singh ...................... G06F 16/00 |
| 2018/0268253 A1* | 9/2018 | Hoffman ............ G06K 9/00483 |

OTHER PUBLICATIONS

Spyrou et al., "Analyzing Flickr metadata to extract location-based information and semantically organize its photo content," Neurocomputing, vol. 172, pp. 114-133, Jan. 8, 2016.

Van den Assem, D. C. F., "Predicting Periodic and Chaotic Signals using Wavenets", Aug. 18, 2017, 90 pages.

Chen, Tianqi, et. al., "XGBoost: A Scalable Tree Boosting System", ACM SIGKDD Conference of Knowledge Discover and Data Mining, Aug. 13-17, 2016, 10 pages.

U.S. Appl. No. 16/112,589—Notice of Allowance dated Jul. 1, 2019, 9 pages.

PCTUS2018052032—International Search Report and Written Opinion dated May 24, 2019, 13 pages.

U.S. Appl. No. 16/112,589—Notice of Allowance dated Nov. 22, 2019, 12 pages.

U.S. Appl. No. 16/567,422—Office Action dated Feb. 26, 2020, 12 pages.

* cited by examiner

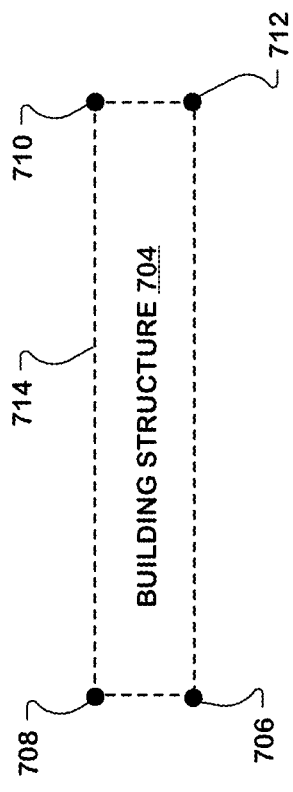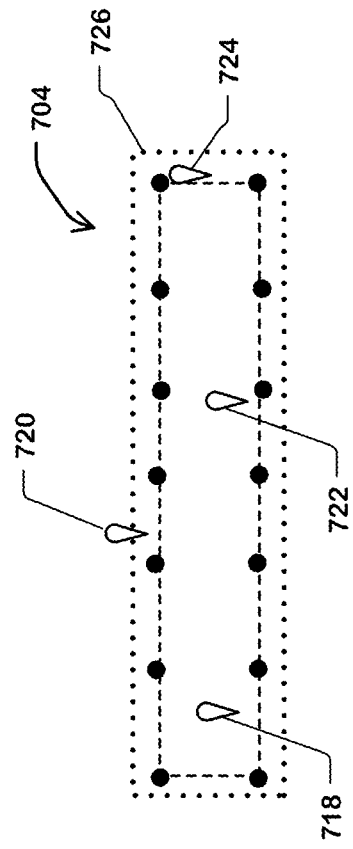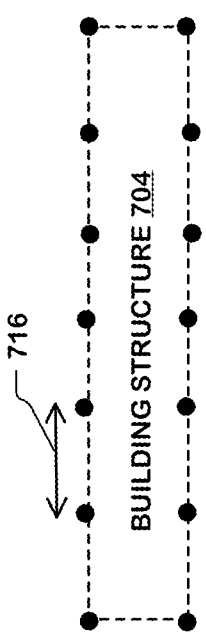
FIG. 7A
FIG. 7B
FIG. 7C
FIG. 7D

DEDUPLICATION OF METADATA FOR PLACES

RELATED APPLICATION

The following U.S. patent applications are incorporated by reference herein: U.S. application Ser. No. 16/112,589, filed 24 Aug. 2018.

FIELD OF THE TECHNOLOGY

The technology disclosed relates to artificial intelligence type computers and digital data processing systems and corresponding data processing methods and products for emulation of intelligence (i.e., knowledge-based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to data deduplication.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

A place-of-interest or a place is generally associated with a centroid that specifies, at a minimum, geospatial coordinates of the place (i.e., the latitude and the longitude). The place also includes metadata profiles comprising information regarding the said place. The metadata may include attributes such as a name associated with the place, a description (e.g., restaurant, bank, retail shop), an address, times of operation, a telephone number and/or a website link. Metadata profiles for places can be obtained from various sources. The various sources may have conflicting information regarding different attributes in the metadata profiles and geospatial coordinates for a given place. For example, source A may indicate that the name for the place located at 1000 5th Ave, New York, N.Y. 10028, U.S.A. is "The Met" while source B may indicate that name is "The Metropolitan Museum of Art." Sources A and B may also have conflicting information for the geospatial coordinates and other metadata attributes. Source C may have an incomplete address for the place with the name "The Metropolitan Museum of Art," such as "5th Ave, New York, N.Y. 10028, U.S.A". The location-specific data gathered by relying on the metadata profiles from various metadata sources will be noisy and error-prone. The centroids provided by the various sources may not accurately specify the physical locations of the places-of-interest.

An opportunity arises to leverage places that are currently available from multiple places sources, and compare, cross-reference, de-duplicate and merge the data to build a more accurate library of places. The centroids of the places can also be improved so that the improved centroid represents the center of the location, and define their physical perimeter in buildings that may be shared by multiples places.

BRIEF DESCRIPTION OF THE DRAWINGS

FIGS. 7A, 7B, 7C, 7D, 7E, 7F, 7G, and 7H illustrate examples of a building structure useful for explaining the process flow of the block generator to identify accurate geospatial coordinates for places.

DETAILED DESCRIPTION

Figure 1:
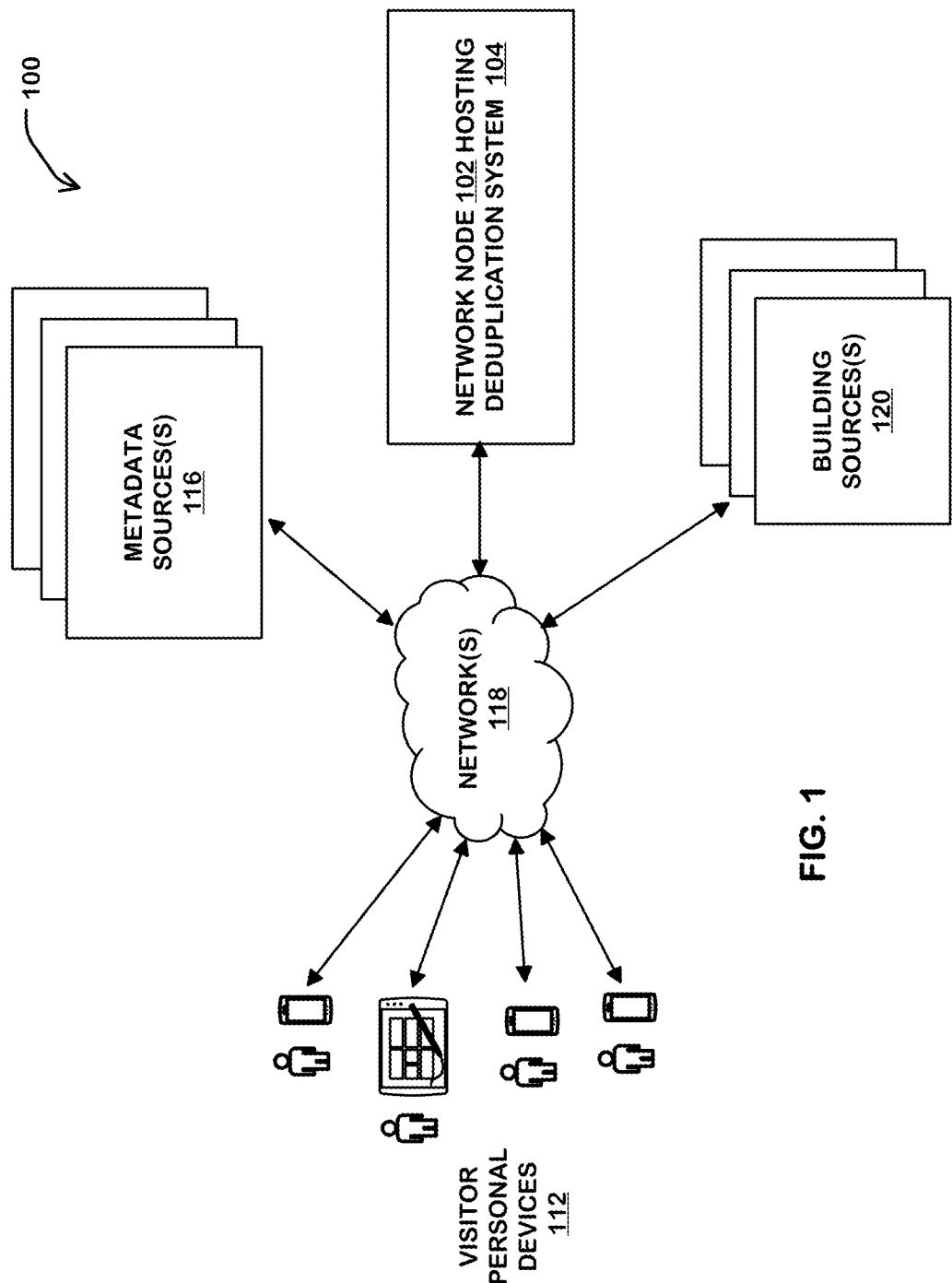
FIG. 1 illustrates an architectural level schematic of an environment that includes a deduplication system for places in accordance with an implementation.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Introduction

The rapid adoption of personal devices with location sensing capabilities, such as smartphones and tablets, has resulted in a high volume of location-specific data. The location-specific data have detailed knowledge of the personal device users location at a point in time. The location-specific data from a particular business location tagged as a "place-of-interest" or "place" includes information about visitor traffic and movement over time in that particular place. Businesses that occupy a particular location can study the location-specific data to plan future business strategy and development. Therefore, it is essential that the location-specific data to be analyzed is accurate.

A place is associated with a metadata profile. The metadata profile may include various attributes, such as a name associated with the place, a description (e.g., restaurant, bank, retail shop), an address, times of operation, a telephone number and/or a web site link. Metadata for places can be obtained from various metadata sources. The various sources may have conflicting information regarding the different attributes in the metadata profiles and the geospatial coordinates for a given place. While some sources may provide most of the attributes in the metadata profile, others may provide information for only a few attributes. Furthermore, the credibility of the information provided for the various attributes also differs from one source to another. For example, source A might provide more accurate geospatial coordinates than source B, while source B might provide more accurate times of operation.

In order to make accurate business predictions about a place, it is crucial that the attributes in the metadata profile of the place are accurate. The technology disclosed applies to merging metadata profiles from various metadata sources, each metadata sources with their own strengths and weaknesses. The metadata profiles from the various sources are compared, deduplicated and merged to create a library of metadata profiles with the most accurate attributes. In other words, the most accurate information from the metadata sources is kept in the library while inaccurate information is discarded.

A key step in discarding inaccurate information and integration of accurate attributes from various metadata sources is the identification and removal of duplicate entries. Deduplicating entries from various metadata sources requires both domain knowledge as well as local geographical knowledge. For example, given two places names n1 and n2 and an approximate geographical location containing both of them, the technology disclosed determines if the two names can refer to the same entity by comparing the geographical proximity of the two places. The technology disclosed may also compare other attributes like phone and address when available to match places.

The technology disclosed uses machine learning-based models to compare and merge metadata profiles from various metadata sources to create a library of metadata profiles with the most accurate attributes. Examples of machine learning-based models include recurrent neural network-based models (e.g., models that use long short-term memory networks or gated recurrent units), and extreme gradient boosted trees.

Data for a place can be gathered with respect to a "centroid" associated with the said place. A centroid specifies the geospatial coordinates of a place (i.e., the latitude and the longitude) in the global map. A centroid does not specify the physical boundary of the place it represents. Location-specific data for the place can be gathered within a certain radius of the centroid. However, such gathered data will be less accurate than data gathered within the physical boundary of the place. Furthermore, centroids have a large margin of error which in turn introduces more inaccuracy in the location-specific data gathered through the error-prone centroids.

Multiple places inside a building structure further complicate the process of gathering location-specific data. The areas defined by the centroids associated with the places inside the building structure may overlap, thereby introducing another level of inaccuracy in the data. For example, the location-specific data for one particular place in the building structure may be used for business decisions of another place situated in the same building structure.

The technology disclosed also applies to hyper-locating the geospatial coordinates of the places within a building structure to the centers of the places. The process of hyper-locating increases the positional accuracy of the centroids associated with the places. The technology disclosed further defines blocks in the building structures, and associates the places with the defined blocks. A block outlines the physical boundary of the associated place inside the building structure. Any data gathered within the physical boundary of the block will be specific to the place associated with the block. Therefore, location-specific data gathered with the help of the hyper-located geospatial coordinates of the places centroids and outlined blocks can have a higher level of accuracy than the data gathered through just centroids.

System Overview

FIG. 1 is an architectural diagram, certain details are intentionally omitted to improve the clarity of the description. The discussion of FIG. 1 is organized as follows. First, the elements of the figure will be described, followed by their interconnections.

The system 100 includes network nodes associated with visitor personal devices 112, the network(s) 118, multiple metadata sources 116, multiple building sources 120, and a network node 102 hosting a deduplication system 104 for places. As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device. For the sake of clarity, only four network nodes associated with visitor personal devices are shown to be connected to the network node 102 hosting the deduplication system 104 through the network(s) 118. However, any number of personal devices can be connected to the network node 102 hosting the deduplication system 104 through the network(s) 118.

The interconnection of the elements of system 100 will now be described. Network(s) 118 couples the network nodes associated with visitor personal devices 112, the network(s) 118, the metadata sources 116, the building sources 120, and the network node 102 hosting the deduplication system 104, all in communication with each other (indicated by solid double-arrowed lines). The deduplication system 104 in network node 102 can gather location-specific visitor data through the network nodes associated with visitor personal devices 112 with location-sensing capabilities. Examples of personal devices with location-sensing capabilities include a smartphone, a personal computing (PC) device such as a laptop computer or other PC derivative, a personal digital assistant (PDA), a tablet computer, a mobile internet device, a wearable computer, a smartwatch, other consumer electronic device, or the like.

The personal devices can estimate their locations through beacons (e.g., iBeacons and Senion beacons), communications with one more GPS satellites, proximity to one or more WiFi sources, multilateration of radio signals between several nearby cell towers, IP addresses of the personal devices, and so on.

The actual communication path through the internet can be point-to-point over public and/or private networks. The communications can occur over a variety of networks 118, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

In order for the deduplication system 104 in the network node 102 to hyper-locate places in a building structure, the system needs to know the shape of the building structure. Such information can be obtained from one or more building sources 120. Examples of building sources include satellite images with an aerial view from satellite imagery providers (e.g., USGS Earth Explorer, Geocento, Harris MapMart, Land Info, Si Imaging Services, Planet, Digital Globe, Airbus, CNES, American EOS, etc.). The shape of a building structure from the aerial view in the images can be translated into a shape datatype, such as Well-Known Text (WKT), GeoJSON, Shapefiles, etc. The shape datatype includes geospatial coordinates of at least the vertices of the building structure shape to represent the 2-D geometry of the building structures on a map. For building structures, the shape is usually a polygon, and the shape datatype lists the longitude and latitude pairs of the vertices of the shape of the building structure. In some implementations, the shape data type can further include geospatial coordinates for additional points along the perimeter of the shape of the building structure. Shapes of building structures can also be obtained from local building departments.

Referring to FIG. 1, the deduplication system 104 in the network node 102 also obtains data on various places through one or more metadata sources 116. The place for a certain business location includes attributes such as geospatial coordinates of a location, a name for the business located in the place, a description, an address, times of operation, telephone and/or website link. Metadata profiles of places can be obtained from multiple sources in any one of the following formats: ASCII Text (.asc .txt .csv .plt), Topografix GPX (.gpx), Garmin Mapsource (.gdb), Google Earth Keyhole Markup Language (.kml .kmz), Pocket Street Pushpins (.psp), Maptech Marks (.msf), Maptech Waypoint (.mxf), Microsoft MapPoint Pushpin (.csv), OziExplorer (.wpt), TomTom Overlay (.ov2) and TomTom plain text format (.asc), OpenStreetMap data (.osm), etc.

Deduplication System for Places

Figure 2:
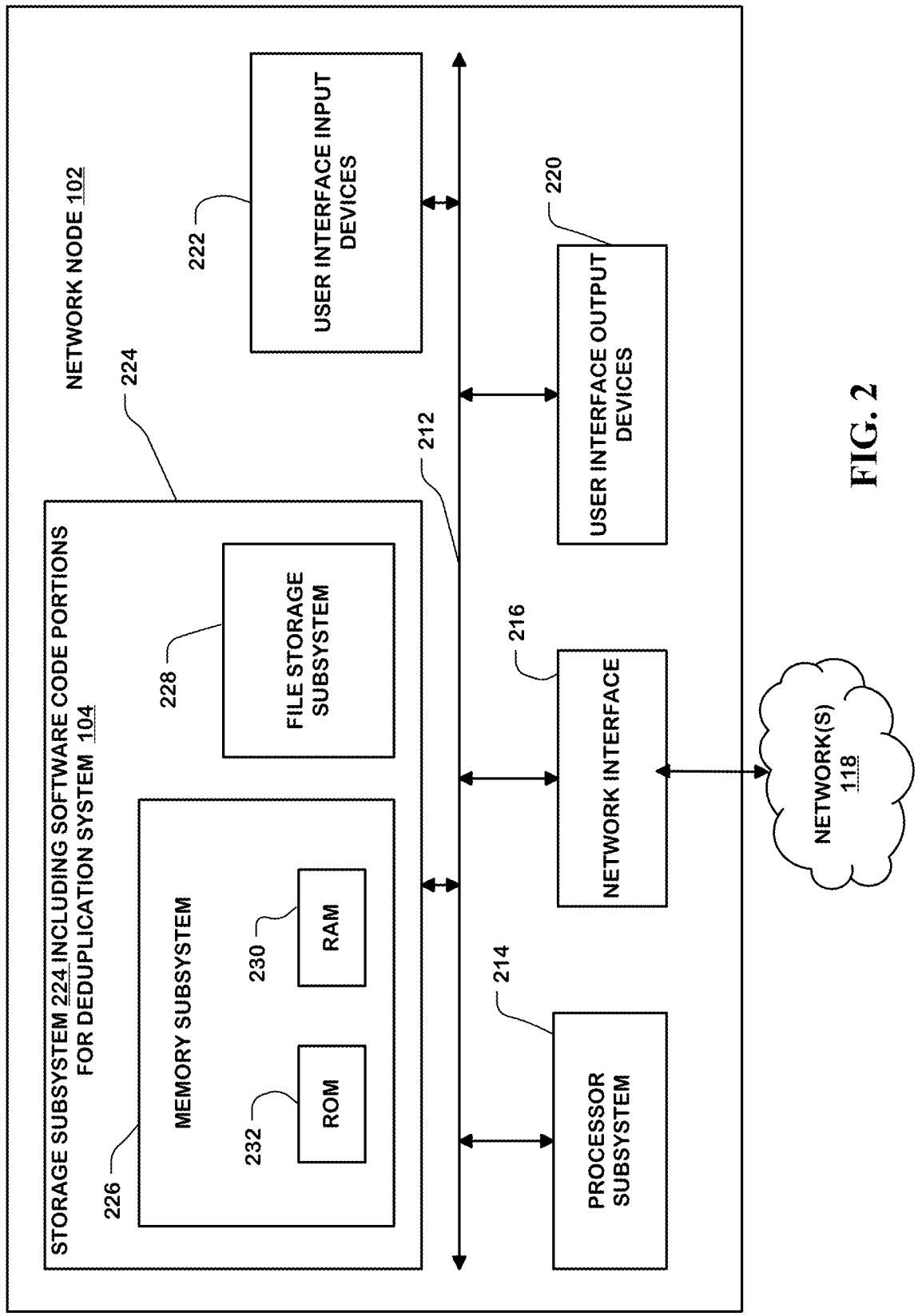
FIG. 2 is a simplified block diagram of a network node hosting a deduplication system.

FIG. 2 is a simplified block diagram of a network node 102 that can be used to implement the deduplication system 104 for places. Network node 102 typically includes an operating system executed by a processor subsystem 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with network node 102. Network interface subsystem 216 provides an interface to outside network 118 and is coupled via network 118 to other elements in system 100. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system. The processor subsystem 214 can include deep learning processors such as Google's Tensor Processing Unit (TPU)™, rackmount solutions like GX4 Rackmount Series™, GX8 Rackmount Series™, NVIDIA DGX-1™ Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™ NVIDIA's JETSON TX1/TX2 MODULE™, Intel's Nirvana™, Movidius VPU™, Fujitsu DPI™, ARM's DynamiclQ™, IBM TrueNorth™, and others. Deep learning processors can be graphics processing units (GPUs) or field-programmable gate arrays (FPGAs).

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 102 or onto network 118.

User interface output devices 220 may include a display subsystem, a printer, a fax machine, or nonvisual displays such as audio output devices. The display subsystem may include a cathode ray tube (CRT), a flatpanel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 102 to the user or another machine or network node. In particular, an output device of the network node 102 on which the hyper-locating system 104 is implemented, may include a visual output informing a user of action recommendations made by the system, or may include a communication device for communicating action signals.

Storage subsystem 224 stores the basic programming and data constructs that provide the functionality of certain implementations of the present invention. For example, the various modules implementing the functionality of certain implementations of the invention may be stored in storage subsystem 224. These software modules are generally executed by processor subsystem 214.

Memory subsystem 226 typically includes a number of memories including a main random access memory (RAM) 230 for storage of instructions and data during program execution and a read-only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. The databases and modules implementing the functionality of certain implementations of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain implementations of the invention may also be stored by file storage subsystem 228. The host memory subsystem 226 contains, among other things, computer instructions which, when executed by the processor subsystem 214, cause the computer system to operate or perform functions as described herein. As used herein, processes and software that are said to run in or on "the host", "the computer" or "the network", execute on the processor subsystem 214 in response to computer instructions and data in the host memory subsystem 226 including any other local or remote storage for such instructions and data.

Bus subsystem 212 provides a mechanism for letting the various components and subsystems of network node 102 communicate with each other as intended. Although bus subsystem 212 is shown schematically as a single bus, alternative implementations of the bus subsystem may use multiple busses.

The network node 102 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of network node 102 depicted in FIG. 2 is intended only as a specific example for purposes of illustrating the preferred implementations of the present invention. Many other configurations of the network node 102 are possible having more or less components than the system depicted in FIG. 2.

In some implementations, the deduplication system 104 for places can be implemented in the network node 102 as a Software-as-a-Service (SaaS) application, a web-architected application or a cloud-delivered service. Examples of common SaaS applications today include Salesforce.com™, Box™, Dropbox™, Google Apps™, Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Figure 3:
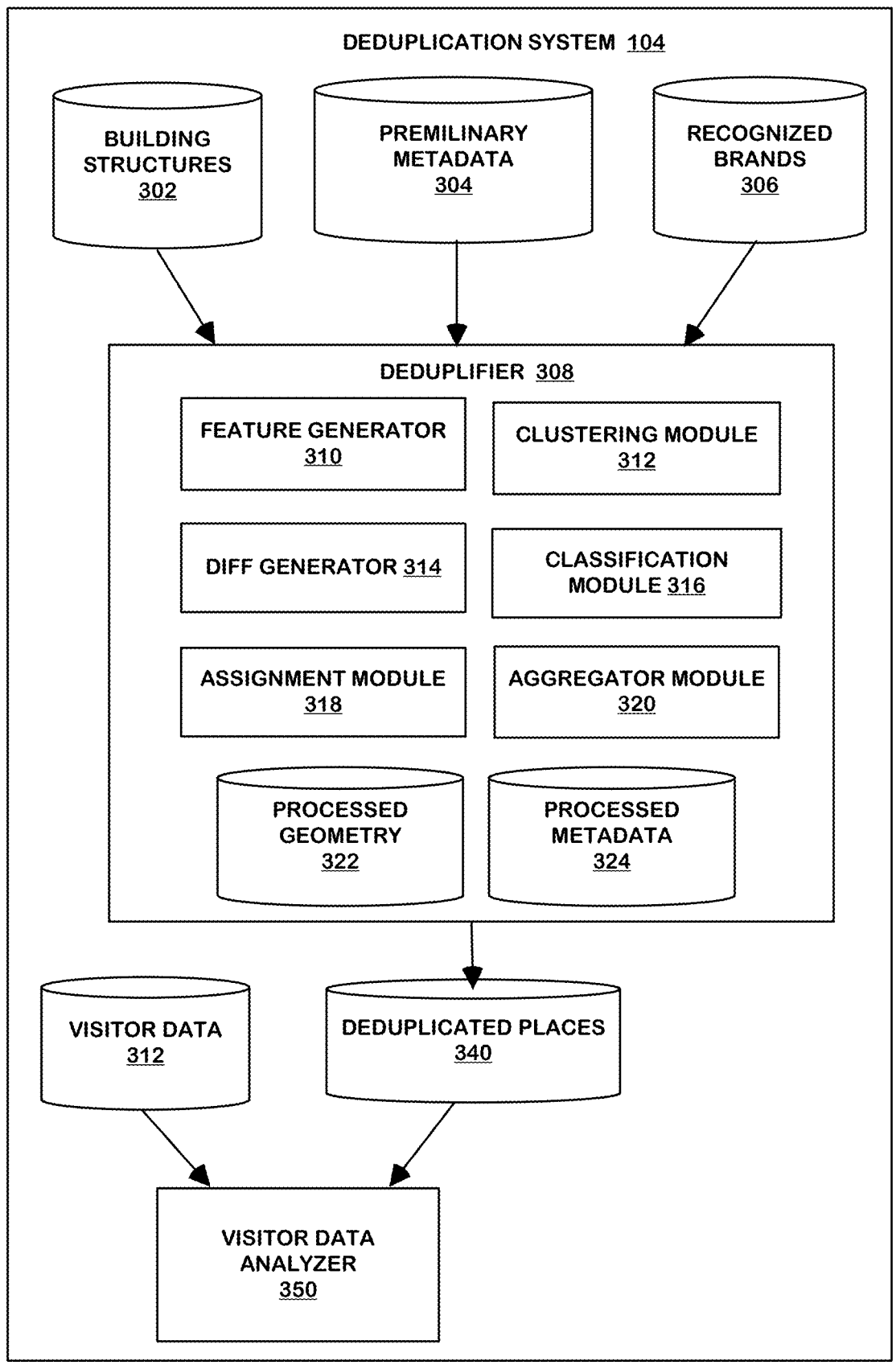
FIG. 3 illustrates an example of a deduplication system.

FIG. 3 illustrates an example of a deduplication system 104 for places. The deduplication system 104 includes software components referred to herein as a deduplifier 308, and a visitor data analyzer 350. The deduplifier 308 further includes a feature generator 310, a clustering module 312, a diff generator 314, a classification module 316, an assignment module 318, and an aggregator module 320.

The deduplication system 104 also includes a building structure database 302, a preliminary metadata database 304, a recognized brand database 306, a visitor data database 312, and a deduplicated places database 340. As used herein, the term "database" does not necessarily imply any unity of structure. For example, two or more separate databases, when considered together, still constitute a "database" as that term is used herein. Databases can include tables. In some implementations, the building structures and preliminary places are stored in separate tables within a single database or, as a comma-separated values (CSV) file or parquet file. The deduplifier 308 includes a processed geometry database 322 and a processed metadata database 324.

The building structure database 302 may store shape datatypes of building structures obtained from the building sources 120. The shape datatypes can be in the form of Well-Known Text (WKT), GeoJSON or Shapefiles. The shape datatype includes geospatial coordinates of the vertices of the shape of the buildings. In some implementations, the building structure database 302 may store the satellite images from the building sources 120. In some implementations, the building structure database 302 may include other optional information that might be helpful for the functionality of the deduplication system 100, e.g., a timestamp of the image used to identify the shape of the building structure, a name of the source of the building structure, the credibility of the source and so on.

The preliminary metadata database 304 stores metadata profiles for places obtained from the metadata sources 116. The preliminary place for a certain business location includes one or more of the following: geospatial coordinates of location, a name for the place, any recognized brand the place is associated with (e.g., Starbucks, Target, etc.), a category for the place according to the North American Industry Classification System (NAICS), a street address, a city, a state, a zip code, times of operation, a telephone number and/or a website link. In some implementations, the preliminary metadata database 304 may include other optional information that might be helpful for the functionality of the deduplication system 100, e.g., a timestamp of when the place was created in the system, a name for the source of the place, the credibility of the source and so on.

The recognized brand database 306 contains information regarding well-known brands, such as Starbucks, Walmart, Macy's, T-Mobile, Bank of America, etc. For each of the recognized brands, the recognized brand database 306 contains information regarding the name of the brand, the stock ticket, sub-brands, website urls, a category according to the North American Industry Classification System (NAICS), a "known" area occupied by a store of that brand, etc. A "known" area occupied by a brand may be the minimum area occupied or the average area occupied. The average area occupied by a recognized brand may be in the range of 50 square meters to 10,000 square meters. For example, the average area occupied by a Macy's store is 2200 square meters, and the average area occupied by a Starbucks store is 195 square meters. The minimum area occupied by a Starbucks store is 46 square meters. In some implementations, the recognized brand database 306 may include other optional information that might be helpful for the functionality of the deduplication system 100, e.g., a name for the source used to obtain information about the recognized brand, the credibility of the source and so on.

The visitor data database 312 stores gathered location-specific visitor data from the visitor personal devices with location-sensing capabilities. The location-specific data may have detailed knowledge about locations of the visitors over time and visitation patterns at various business locations. The visitor data database 312 can include one or more of the following: Universal Time Coordinated (UTC) timestamp of the data entry, the latitude and the longitude of the location of the personal device, the Geohash of the latitude and longitude, the accuracy of the location, an ID that uniquely identifies the device, the name of the place visited, any recognized associated with the place (e.g., Starbucks, Target, etc.), a category for the place according to the North American Industry Classification System (NAICS), a street address, a city, a state, a zip code and so on.

The deduplicated places database 340 stores places with deduplicated metadata profiles. The deduplicated places database 340 can store one or more of the following features for each deduplicated place: a name of the deduplicated place, any recognized brand the deduplicated place is associated with (e.g., Starbucks, Target, etc.), a category for the deduplicated place according to the North American Industry Classification System (NAICS), a street address, a city, a state, a zip code, times of operation, a telephone number and/or a website link. The deduplicated places database 340 also stores information for the hyper-located or corrected geospatial coordinates of the center of the place and a key to associate the deduplicated places database to the shape datatype for the associated block (whether in the same or separate database). The shape datatype can be in the form of Well-Known Text (WKT), GeoJSON or Shapefiles. The shape datatype includes geospatial coordinates of at least the vertices of the block. In some implementations, the shape data type can further include geospatial coordinates for additional points along the perimeter of the block. In some implementations, the deduplicated places database 340 may include other optional information that might be helpful for the functionality of the deduplication system 100, e.g., the timestamp of the creation of the deduplicated place, names of the source of the preliminary metadata profiles used to create the deduplicated place for each deduplicated attributes of the place, the credibility of the source and so on.

The visitor data analyzer 350 analyzes the gathered location-specific visitor data from the visitor data database 312 with respect to the hyper-located geospatial coordinates of the places and defined blocks in the building block with deduplicated places database 340 to discover knowledge patterns about visitors.

Figure 4:
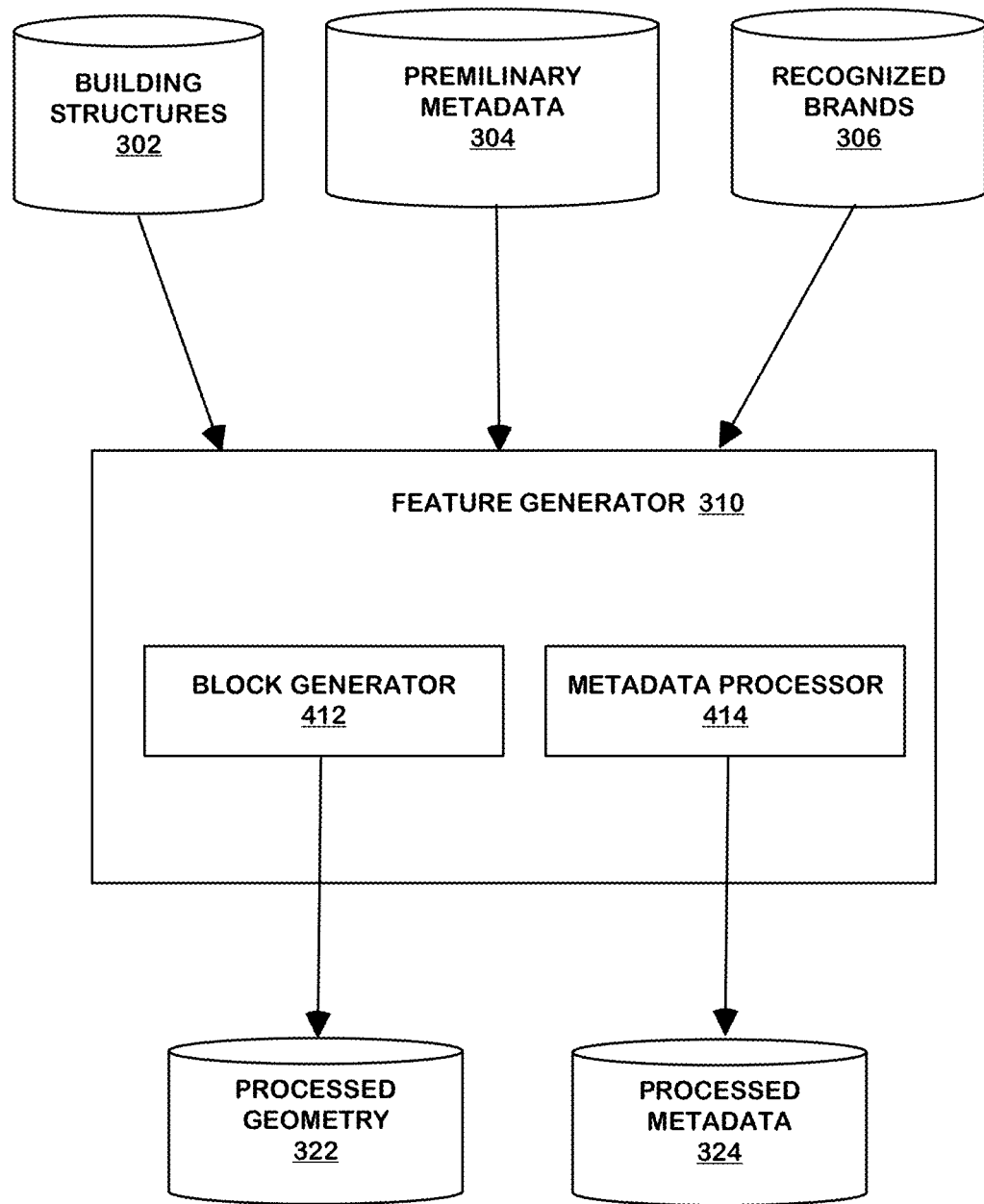
FIG. 4 illustrates an example of a feature generator in the deduplication system in FIG. 1.

FIG. 4 illustrates an example of a feature generator in the deduplifier 308 in FIG. 3. The feature generator 310 includes software components referred to herein as a block generator 412 and a metadata processor 414.

The block generator 412 selects a building structure from the building structure database 302 and identifies preliminary places from the preliminary metadata database 304 within the boundary of the selected building structure. The block generator 412 estimates the geospatial coordinates of the centers of the places within a building structure, thereby increasing the accuracy of the contained places. The block generator 412 further defines and associates blocks to the places contained in the building structure. A block defines the physical boundary of the associated place inside the building structure. Any data gathered within the physical boundary of the block will be specific to the place associated with the block. The block generator 412 store the block defined for each place along with the hyper-located geospatial coordinates in the processed geometry database 322. Detailed of such a process can be found in U.S. application Ser. No. 16/112,589, incorporated by reference herein.

The metadata processor 414 analyzes the metadata profiles representing a plurality of places in the preliminary metadata database 304. The metadata processor 414 processes the metadata profiles to be used for the deduplication and merging process by the clustering module 312, the diff generator 314, the classification module 316, the assignment module 318, and the aggregator module 320. The metadata processor 414 stores the processed metadata profiles in the processed metadata database 324.

Processing of Metadata Profiles

Figure 5:
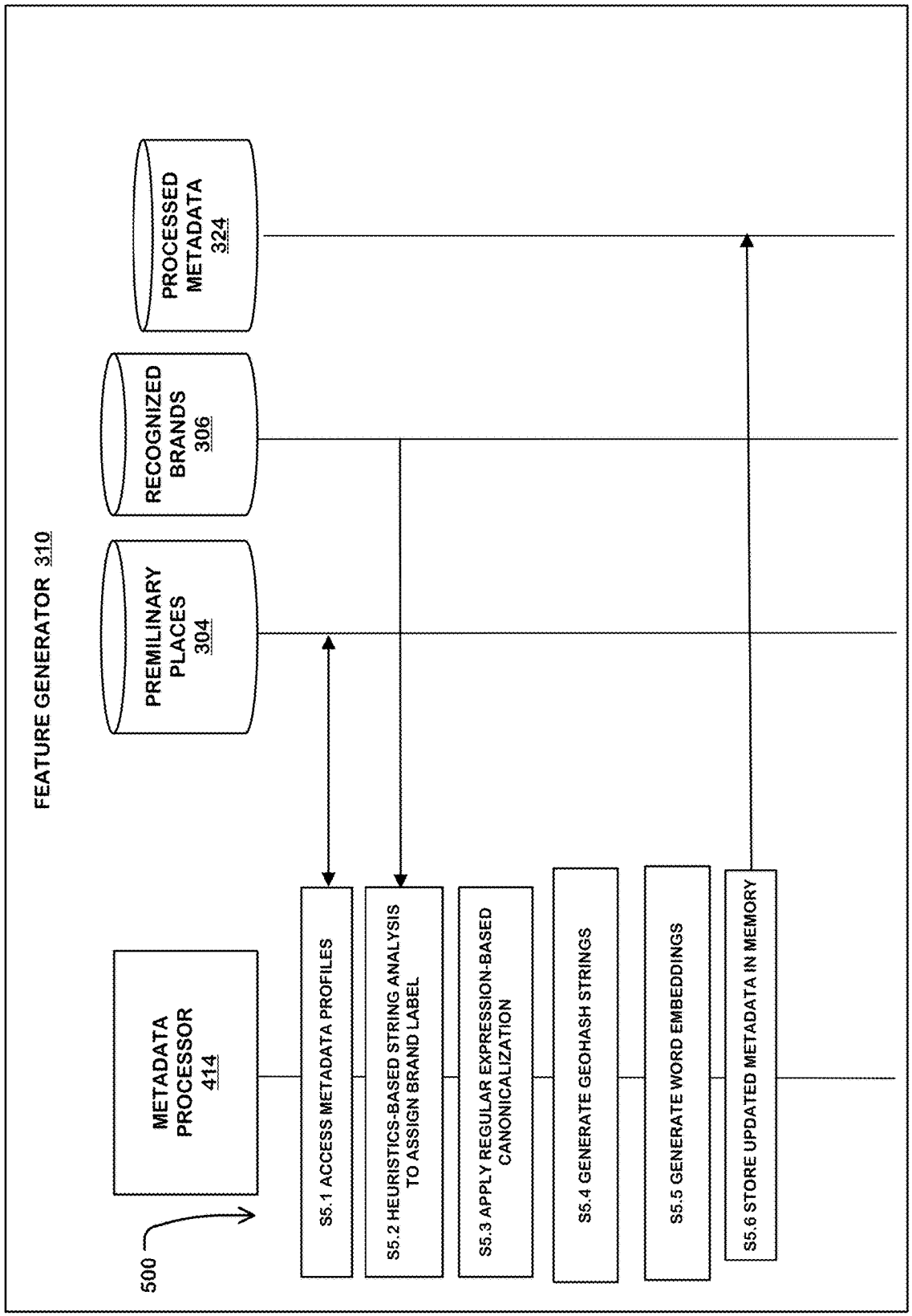
FIG. 5 is a sequence diagram illustrating a representative method of processing metadata by a metadata processor in the feature generator in FIG. 4.

FIG. 5 is an example workflow 500 illustrating a representative method of processing metadata profiles from various metadata sources by the metadata processor 414 in the feature generator 310. In some implementations, the actions in the workflow may be performed in different orders and/or with different, fewer or additional actions than those illustrated in FIG. 3. Multiple actions can be combined in some implementations.

FIG. 5 includes workflow 500 that begins at step S5.1 when the metadata processor 414 accesses preliminary metadata profiles from various metadata sources representing a plurality of places. A business entity may be represented by multiple metadata profiles. In some embodiments, each metadata profile may be from a different metadata source. In some embodiments, a business entity may be represented by two or more metadata profiles from the same metadata source.

At step S5.1, the metadata processor 414 also identifies the attributes of the places included in the preliminary metadata profiles. The attributes may include geospatial coordinates of location, a name for the place, any recognized brand the place is associated with (e.g., Starbucks, Target, etc.), a category identifier for the place according to the North American Industry Classification System (NAICS), a street address, a city, a state, a zip code, times of operation, a telephone number, square footage area occupied by the place and/or a website link. In some embodiments, the metadata processor 414 removes "stop words" from the names of the places. Stop words are words that are linked to the respective place category identifiers. For example, if one of the metadata sources provides a metadata profile for a place with the name "Chili's Restaurant" and the category identifier "restaurant," the word "restaurant" is the stop word and the metadata processor 414 may remove the stop word "Restaurant" from the name.

At step S5.2, the metadata processor 414 applies a heuristics-based string analysis to the attributes of a place, such as the name, the category identifier, and the area, to assign a brand label to each metadata profile. The heuristics-based analysis may extract key terms in the attributes and detect associated brand labels based on the extracted key terms based on a set of learned rules. The brand label may belong to a recognized brand stored in the recognized brand database 306. For example, if one of the metadata sources provides a metadata profile for a place with the name "Chili's Restaurant Kalamazoo," a heuristic based analysis may identify the key term "Chili's" and associate the place with the restaurant chain Chili's. In some embodiments, the heuristics-based string analysis may include comparing the names of the places to known aliases of the recognized brands stored in the recognized brand database 306. In some embodiments, the heuristics-based string analysis may include comparing the category identifiers to that of the recognized brands stored in the recognized brand database 306. In some embodiments, the heuristics-based string analysis may include comparing the areas of the places to average area bounds observed for the recognized brands stored in the recognized brand database 306. For example, a McDonald's fast-food restaurant has an area of 50 to 900 sq.

meters and if the area listed in the metadata profile is three standard deviations away from its average area of McDonald's fast-food restaurant, then the place is unlikely to be a store of the fast-food chain.

At step S5.3, the metadata processor 414 applies regular expression-based canonicalizations to place addresses and place contact numbers of the metadata profile to generate canonicalized address fields and canonicalized contact number fields. The regular expression-based canonicalization process splits an address string into one or more entities, such as the house number, the pre-direction (e.g., "West" in "16 West Mission St"), the post-direction (e.g., "West" in "16 Mission St West"), the street name, the city, the state code, the zipcode, the zipcode+4 digits, and/or the country. The regular expression-based canonicalization process splits the phone contact number attribute into one or more entities, such as the country code, the area code, the phone number, and/or an extension. In some embodiments, the heuristics-based string analysis uses an expression-based canonicalization to generate canonicalized place names. In some embodiments, prior to the canonicalization process, the names of the places are normalized by removing non-UTF-8 characters, trimming multiple spaces, and correcting spelling mistakes.

At step S5.4, the metadata processor 414 generates geohash strings based on the canonicalized address fields. A "geohash string" is a geocoding system which encodes a geographic location into a short string of letters and digits. The geohash string is a hierarchical spatial data structure which subdivides space into buckets of grid shape, which is one of the many applications of what is known as a Z-order curve, and generally space-filling curves.

The geohash strings can be generated by using the geographical coordinates of the centroids of the places, or the canonicalized address fields. In some embodiments, the metadata processor 414 may apply a waterfall analysis to generate geohash strings that start with the geographical coordinates of the centroids of the places, if available, then the last four digits of the zipcode+4 and continues with the primary zipcode, the city name, the state name identifier, and the country name.

At step S5.5, the metadata processor 414 generates word embeddings for the names of the places. The metadata processor 414 uses semantics features based on word embedding in a multi-dimensional vector space using techniques, such as Word2Vec or global vectors (GloVe), for word representation. In semantic similarity, the idea of the distance between the names is based on the likeness of their meaning or semantic content as opposed to similarity regarding their syntactical representation (for example, their string format). For example, a "grocery" is similar to a "market" in that both are places where one can purchase food. Names based on semantic feature represent words in a vector space where semantically similar words are mapped to nearby points or in other words are embedded nearby each other. Word2Vec and GloVe are two example machine learning techniques for learning word embeddings representing names of places.

At step S5.6, the metadata processor 414 stores the features of respective metadata profiles in the processed metadata database 324. A feature refers to data describing a place, a place-of-business or place-of-interest. Some examples include the word embeddings of the names, the place category identifiers, brand labels, the canonicalized address fields, the canonicalized contact number fields, and the geohash strings. Other examples of features will be apparent to one skilled in the art.

Processing of New Building Structures

Figure 6:
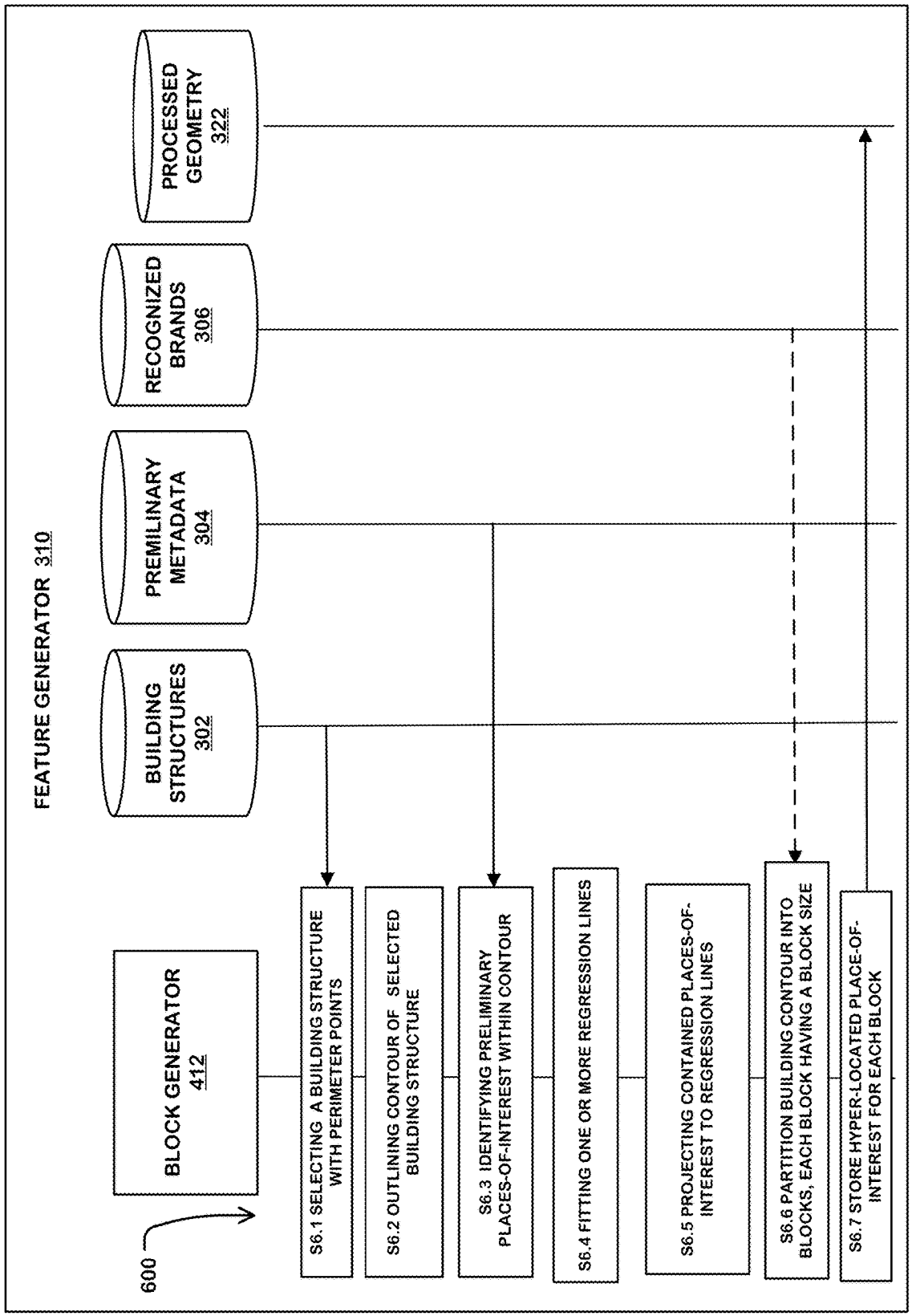
FIG. 6 is a sequence diagram illustrating a representative method of hyper-locating places in a building structure by a block generator in the feature generator in FIG. 4.

FIG. 6 is an example workflow 600 illustrating a representative method of hyper-locating places in building structures by the block generator 412 in the deduplication system 104. In some implementations, the actions in the workflow may be performed in different orders and/or with different, fewer or additional actions than those illustrated in FIG. 6. Multiple actions can be combined in some implementations.

FIG. 6 includes workflow 600 that begins at step S6.1 when the block generator 412 selects building structures from the building structure database 302. In some implementations, the block generator 412 may receive multiple sets of geospatial coordinates of perimeter points of the same building structure from different building sources, and the block generator 412 may select one set from the multiple sets based on the trustworthiness or credibility of the sources. In some implementations, the block generator 412 may select a building structure based on the geographic location of the building structure. In some implementations, the block generator 412 may select a building structure based on a minimum area requirement. In some implementations, the block generator 412 may select a building structure based on the elevation of the building structure. In some implementations, the block generator 412 may not select a building structure if there are no places in the vicinity of the building structure. In some implementations, the block generator 412 will not select a building structure if the building structure overlaps with one or more roads.

Figure 7E:
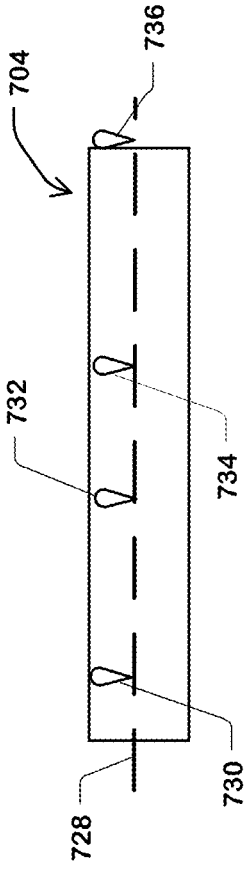

The workflow 600 is described with an example building structure identified in FIG. 7A. FIG. 7A illustrates a rectangular building structure 704. The technology disclosed will be described with a rectangular building structure as an example. However, any building shape can be used by the technology described herein.

A plurality of perimeters points defines the selected building structure. The perimeter points are the geospatial coordinates associated with the vertices of the shape of the building structure. In another implementation, in addition to the geospatial coordinates associated with the vertices of the shape of the building structure, the perimeter points includes additional geospatial coordinates along the perimeter of the shape. FIG. 7B illustrates the perimeter points of the rectangular building structure 704. The rectangular building structure 704 has the perimeter points 706, 708, 710 and 712.

Referring to FIG. 6, the workflow 600 continues at step S6.2 the block generator 412 outlines a contour of the selected building structure based on geospatial coordinates of perimeter points of the building structure. FIG. 7B illustrates the contour outlined by the block generator 412 for the building structure 704. The rectangular building structure 704 has an outlined contour 714 along the perimeter points 706, 708, 710 and 712.

In some implementations, the block generator 412 may add geospatial coordinates of additional perimeter points along the distribution of the geospatial coordinates of the perimeter points of the building size with a step size. The step size is the distance between the geospatial coordinates of two perimeter points. The step size may be in the range of 1 to 100 meters. The step size may 20 meters.

FIG. 7C illustrates additional perimeter points added by the block generator 412 for the building structure 704. The rectangular building structure 704 has additional perimeter points with the step size 716.

Referring to FIG. 6, the workflow 600 continues at step S6.3 where the block generator 412 identifies preliminary places within the contours of the selected building structures. In some implementations, the block generator 412 may intersect the places to identify the contained places inside the contours of the building structures. The block generator 412 may further identify preliminary places with a certain radius around the geospatial coordinates of the perimeter points as contained places. In some implementations, the radius may be in the range of 1 to 100 meters. In some implementations, the radius may be 20 meters. In some implementations, the radius may be 15 meters. In some implementations, the block generator 412 may choose a radius before identifying the contained places. The place points 718 and 722 are identified as contained places within the rectangular building structure 704 as illustrated in FIG. 7D. Additionally, the place points 720 and 724 that are outside the rectangular building structure 704 but within a certain radius 726 are identified as contained places.

Referring to FIG. 6, at step S6.4, the block generator 412 identifies one or more pieces in the contour and, for each one of the pieces, fits a regression line in the said piece. In some implementations, the regression line for an identified piece is estimated by fitting a piecewise linear function to the perimeter points in the piece. In some implementations, the regression line for an identified piece is estimated by fitting a piecewise linear function to the perimeter points and the contained places in the piece. In some implementations, the block generator 412 may buffer or push the perimeter points inwards to ensure that the splines are within the contour.

In some implementations, the block generator 412 may identify only one piece in the contour of the building structure and estimate one regression line for the identified piece. For example, only one piece is identified for the rectangular building structure 704 in FIG. 7E. The block generator 412 generates a regression line 728 for the rectangular building structure 704.

In some implementations, the block generator 412 may identify one or more rectangular pieces in the contour of a non-rectangular shaped building structure. In some implementations, the block generator 412 identifies the rectangular pieces by sampling random perimeter points within the contour and iteratively projecting line segments through some of the random perimeter points to decompose the contour into disjoint maximum-area rectangular pieces. In some implementations, the block generator 412 terminates identifying rectangular pieces when the combined area of the identified disjoint maximum-area rectangular pieces covers a certain percentage of the contour of the building structure. In some implementations, the coverage may be ninety-five percentages. In some implementations, the coverage may be in the range of seventy to a hundred percentages.

In some implementations, the block generator 412 may identify the principal axes of the building structure and estimate the regression line of the pieces identified within the contour of the building structure along one of the principal axes. The principal axes of the building structure can be determined from a principal component analysis of the perimeter points and/or the contained places.

Referring to FIG. 6, at step S6.5 of the workflow 600, the block generator 412 projects some or all of the contained places onto the regression lines. During "projection," the geospatial coordinates of a contained place is adjusted so that the geospatial coordinates fall on the nearest regression line. The adjustment is made orthogonally to the nearest regression line. A place with adjusted geospatial coordinates is known as "adjusted" place.

Figure 7F:
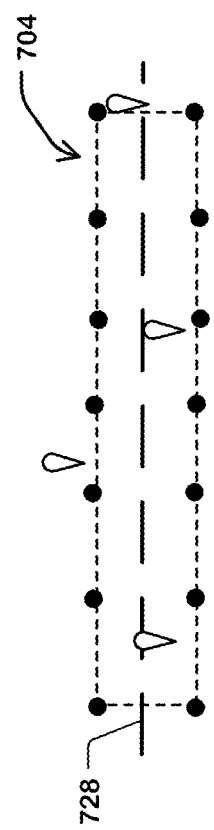

FIG. 7F illustrates the projection of the contained places 718, 720, 722 and 724 in the building structure 704 on the regression line 728, creating the adjusted places 730, 732, 734 and 736 respectively.

Referring to FIG. 6, at step S6.6 of the workflow 600, the block generator 412 partitions the contour of the building structure into blocks or Voronoi cells by using the adjusted places in step S6.5 as seeds. Each block is associated with a block size (i.e., area occupied by the business location represented by the place). The block generator 412 partitions the building contour into blocks by orthogonally projecting block boundaries between two or more adjusted places. The block generator 412 partitions the building contour with N adjusted places into blocks such that each block contains exactly one adjusted place and every adjusted point in a given block is closer to its adjusted place than to any other adjusted place. Various algorithms can be used to partition the building contour into blocks, such as Fortune's algorithm for generating a Voronoi diagram, Lloyd's algorithm, Linde-Buzo-Gray algorithm, Delaunay triangulation, and Bowyer-Watson algorithm, and so on.

In some implementations, the number of blocks to be partitioned is determined based on the number of contained places inside the contour of the building structure. In some implementations, the block generator 412 may generate a block for each contained place or some of the places from the entire set of contained places. In some implementations, all the partitioned blocks inside the contour of the building structure may have equal area. In some implementations, the block sizes have a minimum threshold area of hundred square meters.

Figure 7G:
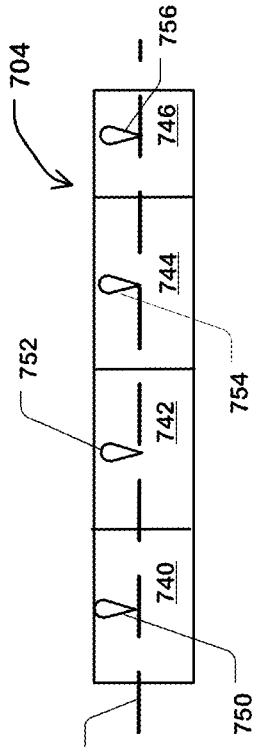

FIG. 7G illustrates four blocks 740, 742, 744 and 746 partitioned in the contour of the rectangular building structure 704 for the adjusted places 730, 732, 734 and 736 respectively.

In some implementations, the block generator 412 may identify the brand of one or more of the adjusted places to be a recognized brand stored in the recognized brand database 306. For such adjusted places, the block generator 412 may adjust the block size for the said contained place with a block size proportional to the known areas occupied by the recognized brand.

Figure 7H:
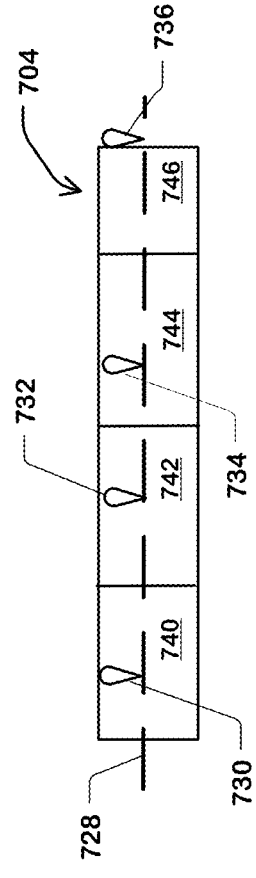

Referring to FIG. 6, at step S6.7 of the workflow 600, the block generator 412 determines the geospatial coordinates of a centroid of a particular block based on a mean of geospatial coordinates of vertices of said block and adjusts the geospatial coordinates of the associated adjusted place to be the geospatial coordinates of the centroid. The revised adjusted place is known as a "hyper-located" place. FIG. 7H illustrates the hyper-located places 750, 752, 754 and 756 for the blocks 740, 742, 744 and 746 respectively in the rectangular building structure 704.

In some implementations, supplementary partitioning and attribution may be performed for places not matched to a block.

Referring to FIG. 6, at step S6.8 of the workflow 600, the block generator 412s stores the hyper-located places in the processed geometry database 322. Each hyper-located places entry in the database stores information for the adjusted geospatial coordinates of the place and the shape datatypes for the associated block. The shape datatype can be in the form of Well-Known Text (WKT), GeoJSON or Shapefiles. The shape datatype includes geospatial coordinates of the at least the vertices of the block. In some implementations, the shape data type can further include geospatial coordinates for additional points along the perimeter of the block. The processed geometry database 322 can also store one or more of the following for each hyper-located place: a name of the adjusted place, any recognized brand the hyper-located place is associated with (e.g., Starbucks, Target, etc.), a category of the hyper-located place according to the North American Industry Classification System (NAICS), a street address, a city, a state, a zip code, times of operation, a telephone number and/or a website link.

Deduplication of Metadata Profiles

Deep neural networks are a type of artificial neural networks that use multiple nonlinear and complex transforming layers to successively model high-level features. Deep neural networks provide feedback via backpropagation which carries the difference between observed and predicted output to adjust parameters.

Deep neural networks are a family of parametric, non-linear and hierarchical learning functions. Given a dataset D, deep neural networks need to find the optimal parameters θ that minimize some loss function. These models are called networks because they are a collection of functions that can be represented as an acyclic graph. The acyclic graph is divided into layers, and each layer represents a computation of the form:

$$h_1 = f_1(W_1 \cdot x + b_1)$$

where x is the multidimensional input of the model that is mapped to the hidden unit $h_1$ using weights $W_1 \in \theta$ and biases $b_1 \in \theta$. The function $f1(\cdot)$ is called an activation function. The output of one layer can be used as input for another layer.

$$h_2 = f_2(W_2 \cdot f_1(W_1 \cdot x + b_1) + b_2)$$

Hence the hierarchical aspect of neural networks. The field of deep learning focuses on neural networks with a large number of these layers because they are capable of approximating more complex functions.

Figure 8B:
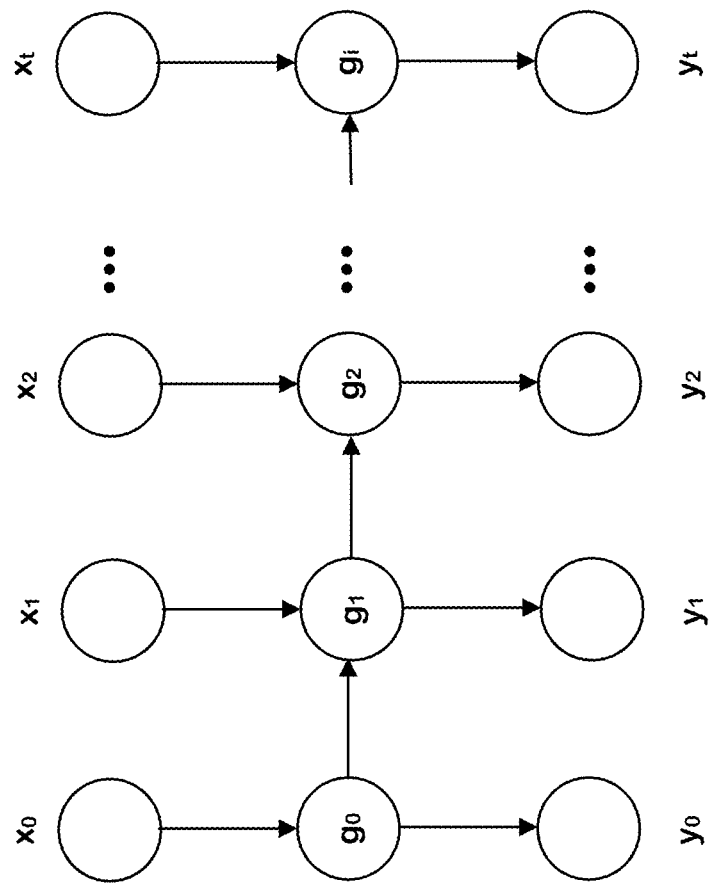
FIGS. 8A and 8B illustrate a recurrent neural network.
Figure 8A:
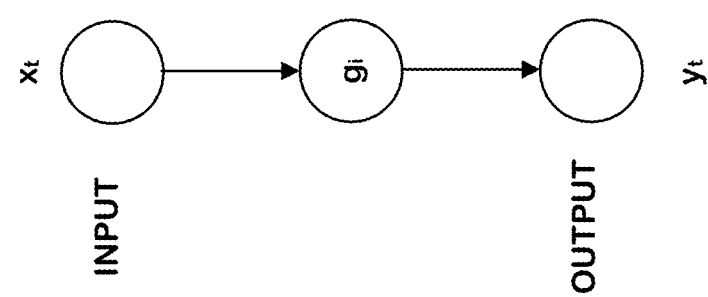

Recurrent neural networks (RNN) are part of the family of deep neural networks and are able to process sequential data. To understand the information that is incorporated in a sequence, an RNN needs memory to know the context of the data. Information about the past is passed through the network using hidden states. Therefore a single computational unit can be dependent on its previous states. The idea of using RNN's is to get a natural way of the persistence of memory. The cycles allow the RNN's to get this persistence behavior. FIG. 8A illustrates a schematic representation of an RNN, where g is a part of a neural network and should not be confused with the activation function. The unfolded network in FIG. 8B clarifies how an RNN works. It can be seen as a neural network composed of smaller neural networks in which information is passed in an ordered way. The unfolded network shows that if t represents the time, causality relations hold in these type of networks. This makes the RNN interesting for studying time series. In the study of time series on a daily basis, seasonal features need to be detected. The period of a season can become relatively large. Theoretically, it should be possible to learn any relation between the past with the current time, since the information is passed through each block. However, learning long term dependencies for RNN's using gradient descent algorithms is difficult.

Figure 9:
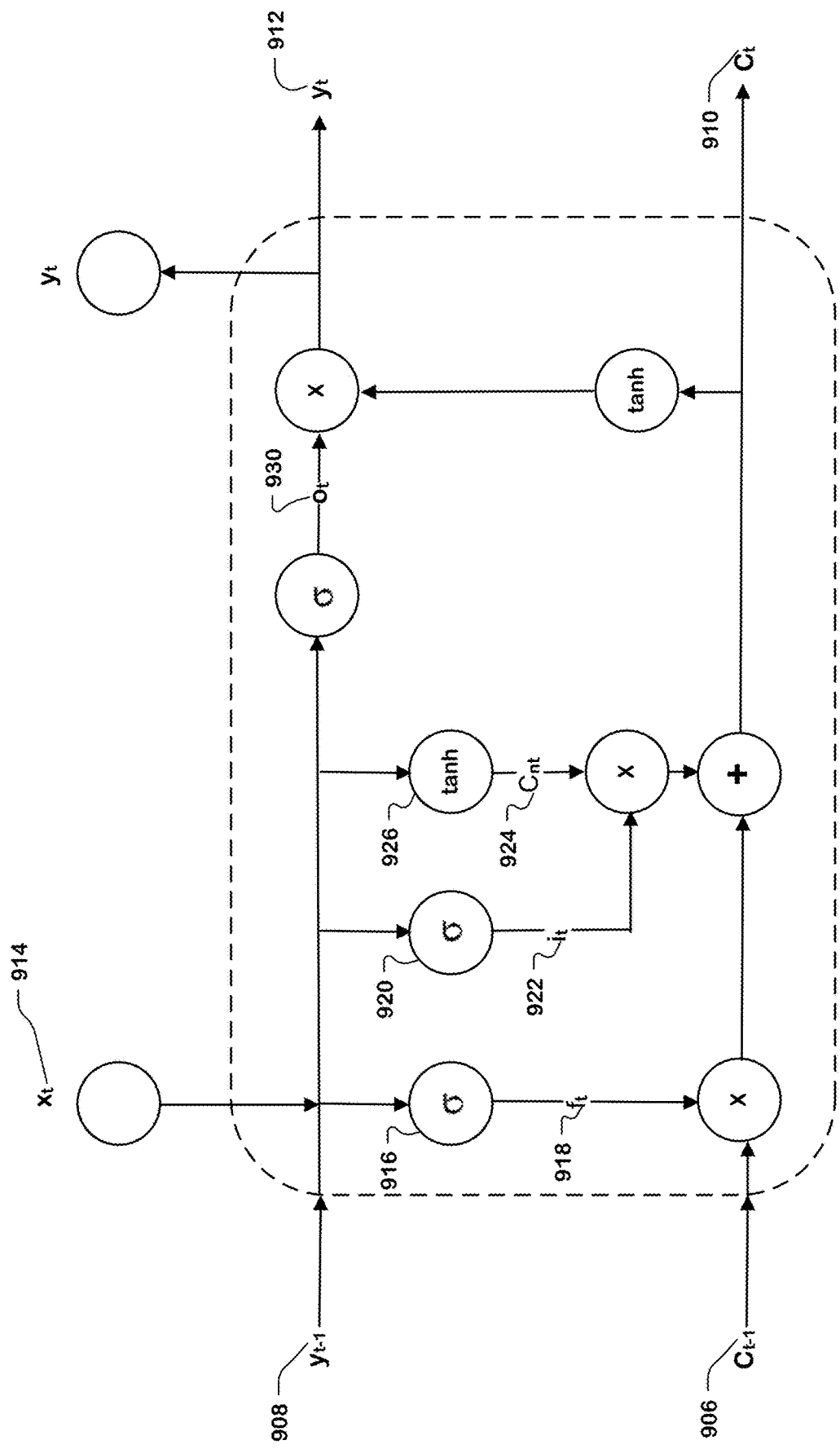
FIG. 9 illustrates an example LSTM block.

The Long Short Term Memory (LSTM) recurrent neural network is designed to be able to learn these long-term relations without overlooking the short-term dependencies. FIG. 9 illustrates a block of an LSTM. In FIG. 9, × and + are point-wise operators, and σ and tanh are activation functions. Two joining arrows make a concatenate operation. Two splitting arrows make a copy operation. The LSTM block is repeated in the same way as the RNN. The LSTM block consists of two lines passing horizontally, the y-value which corresponds to the output of a block and the C-value which corresponds to the cell state. The horizontal lines have inputs $C_{t-1}$ 906 and $y_{t-1}$ 908 from the preceding blocks, and outputs $C_t$ 910 and $y_t$ 912 to the succeeding blocks. Vertically, for each block, there is an input x and an output y.

Starting with the input $x_1$ 914, the signal is concatenated with $y_{t-1}$ 908 to obtain $[y_{t-1}, x_t]$. Following the first arrow pointing downwards, the values are passed through a sigmoid function a 916. The output $f_t$ 918 of the sigmoid function σ 916 function is defined as:

$$f_t = \sigma(W_f \cdot [y_{t-1}, x_t] + b_f)$$

The function above is called the forget gate, since the output, a value in (0, 1), decides whether the preceding cell state is remembered or forgotten using the point-wise product operator.

Following the second arrow pointing downwards, the signal $[y_{t-1}, x_t]$ arrives at another sigmoid function a 920 which is called the input gate. The output $i_t$ 922 decides which values are used for the update. The output $i_t$ 922 is:

$$i_t = \sigma(W_i \cdot [y_{t-1}, x_t] + b_i)$$

The third arrow pointing downwards generates new candidate values $C_{nt}$ 924 for the cell state by using the tanh function 926. By taking the cross product with the input gate, the update for the cell state can be determined using:

$$C_{nt} = \tanh(W_C \cdot [y_{t-1}, x_t] + b_C)$$

$$C_t = f_t * C_{t-1} + i_t * C_{nt}$$

The new cell state is a combination of the old cell state and the new candidate in which the forget gate and the input gate gradual decide whether to use the old cell state and new input respectively.

The output gate $o_t$ 930 transforms the signal $[y_{t-1}, x_t]$ as defined by:

$$o_t = \sigma(W_o [y_{t-1}, x_t] + b_o)$$

By taking the product of the tanh of the updated cell state Ct 910 and the output gate $o_t$ 930, the new output $y_t$ 912 is defined as:

$$y_t = o_1 * \tanh(C_t)$$

The main components of the LSTM are the cell state and the output. The new cell state is defined by the forget gate and input gate. The new output is defined by the output gate and the new cell state. By adding n of these blocks, the size of the vectors passing through the blocks is growing linearly.

XGBoost stands for eXtreme Gradient Boosting, and it is a distributed implementation of gradient boosting with emphasis on efficiency, flexibility, and portability. It provides parallel tree boosting and is faster when compared with other gradient boosting implementation.

A decision tree is a model that begins with a single non-leaf node that branches into different outcomes. Then the outcomes lead to more additional nodes. Each non-leaf node represents the test on one particular feature, each branch represents the outcome of this feature, and each leaf node stores a classification. Once the split for each feature is done, the one with the minimum loss is viewed as the best split criteria and set it as a rule for that node. The splitting process keeps going until the termination condition is met.

Boosting technique holds the principle that a combination of weak classifiers can create a single strong classifier. Weak classifiers are classifiers that tend to perform insufficiently when applied in isolation but well when combined with other weak classifiers trained on the same dataset. For the boosting methods, the additive training method is applied in each step, during which a week classifier is added to the model. In XGBoost, the weak classifier is the new decision tree. Equations below show this hallmark:

$$F_0=0$$

$$F_t(x)=F_{t-1}(x)+h(x)$$

where h(x) is the new decision tree after $F_{t-1}(x)$ and $F_t(x)$ is the new model after t–1 steps. The objective of the XGBoost model is to find the tree $F_t(x)$ that minimizes the following equation at the $t^{th}$ step:

$$Obj(F_t)=L(F_{t-1}+F_t)+\Omega(F_t).$$

L is the loss function that decides the predictive power, and $\Omega$ is the regularization function controlling the overfitting.

Figure 10:
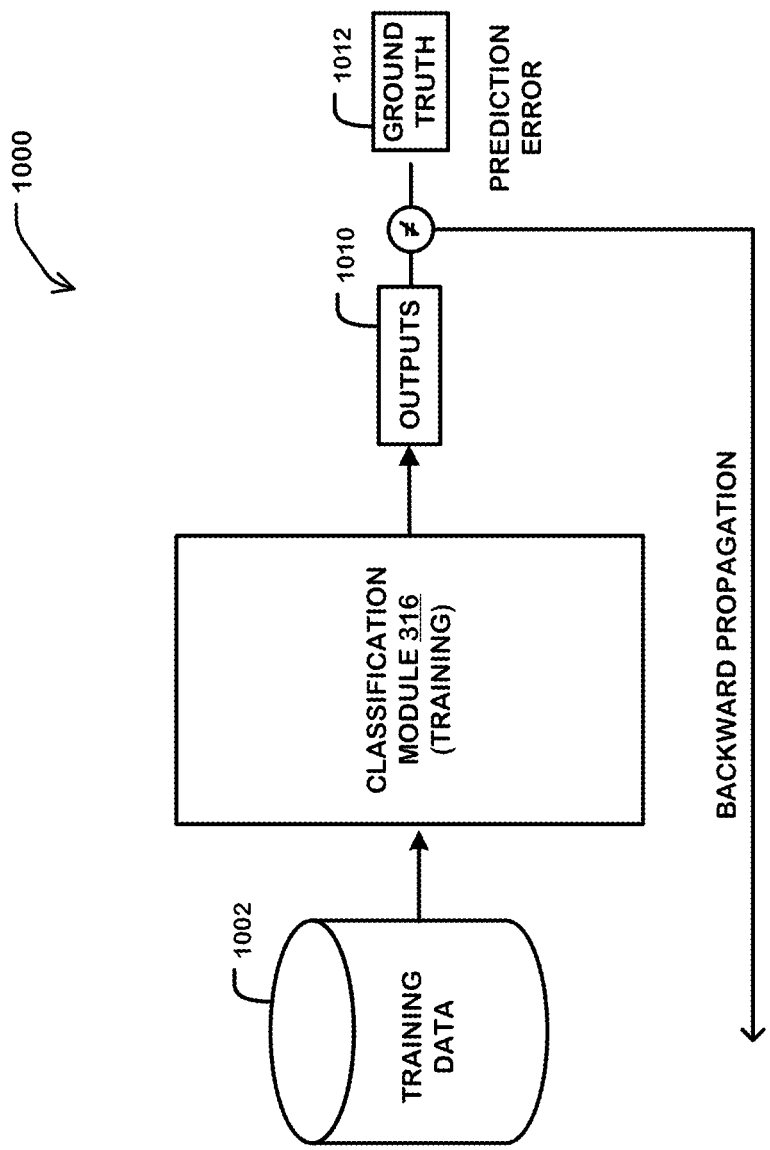
FIG. 10 illustrates one implementation of a training stage in which machine learning based models in the classification module in the deduplication system in FIG. 3 are trained on training data to pair various metadata profiles of a place.

FIG. 10 illustrates one implementation of a training stage in which an LSTM recurrent neural network in the classification module 316 in the deduplifier 308 in FIG. 3 are trained on training data to predict the similarity between metadata profiles that may represent the same place. The goal of training the recurrent neural networks is optimization of the weight parameters in each layer, which gradually combines simpler features into complex features so that the most suitable hierarchical representations can be learned from the training data. A single cycle 1000 of the optimization process is organized as follows. First, given a training dataset 1002 to the classification module 316 under training, the forward pass sequentially computes the output 1010 in each layer and propagates the function signals forward through the network. In the final output layer, an objective loss function measures error between the inferenced outputs and the ground truth 1012. To minimize the prediction error, the backward pass uses the chain rule to backpropagate error signals and compute gradients with respect to all weights throughout the neural network. Finally, the weight parameters are updated using optimization algorithms based on stochastic gradient descent. Whereas batch gradient descent performs parameter updates for each complete dataset, eXtreme Gradient Boosting can provide stochastic approximations by performing the updates for each small set of data examples. In some implementations, the classification module is trained on a training data set of at least a hundred thousand examples of paired metadata profiles using a backpropagation-based gradient update technique.

Figure 11:
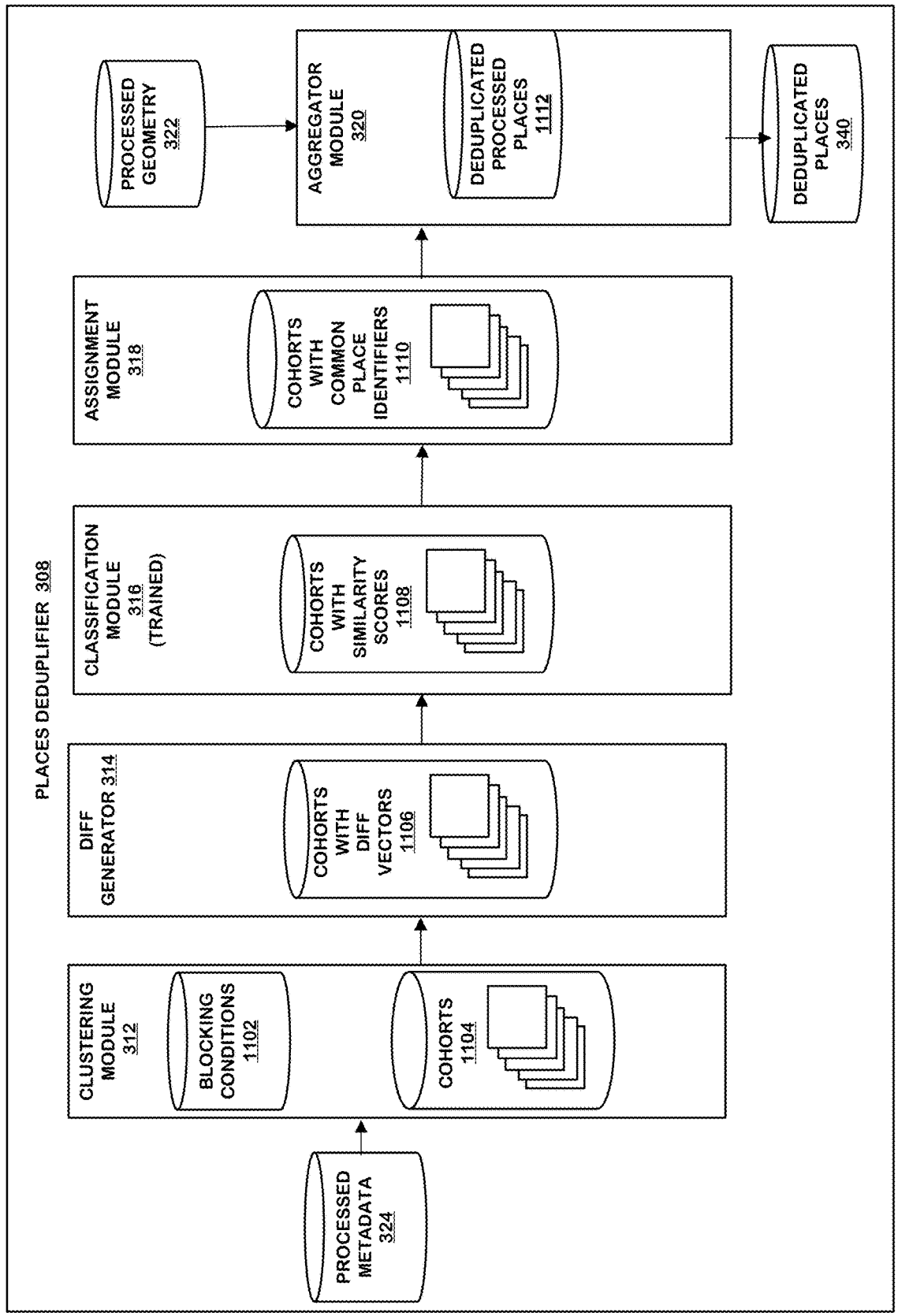
FIG. 11 shows one implementation of a production/inference stage in which trained machine learning-based models from FIG. 10 are used to evaluate metadata profiles by the deduplication system.

FIG. 11 shows one implementation of a production/inference stage in which trained LSTM RNN based models in the classification module 316 from FIG. 10 are used to evaluate metadata profiles by the deduplication system.

A clustering module 312 clusters the processed metadata profiles stored in the processed metadata profile 324 into cohorts 1104 of similar metadata profiles. The processed metadata profile are clustered based on a plurality of blocking conditions stored in the database of blocking conditions 1102. In some embodiments, one blocking condition may be applied. In some embodiments, two or more blocking conditions may be applied. In some embodiments, the blocking condition may be the matching of a predetermined number of first characters in the geohash strings of the processed metadata profiles in a cohort. In some embodiments, the predetermined number of characters may be less than 6, ensuring that the places represented by the processed metadata profiles in the cohort are less than 100 miles apart. In some embodiments, the blocking condition may be that the places representing by the processed metadata profiles in the cohort belong to the same city. In some embodiments, the blocking condition may be that the difference in the zip codes in the processed metadata profiles in the cohort is less than 500. In some embodiments, the blocking condition may be that the names of the places are similar.

Figure 12A:
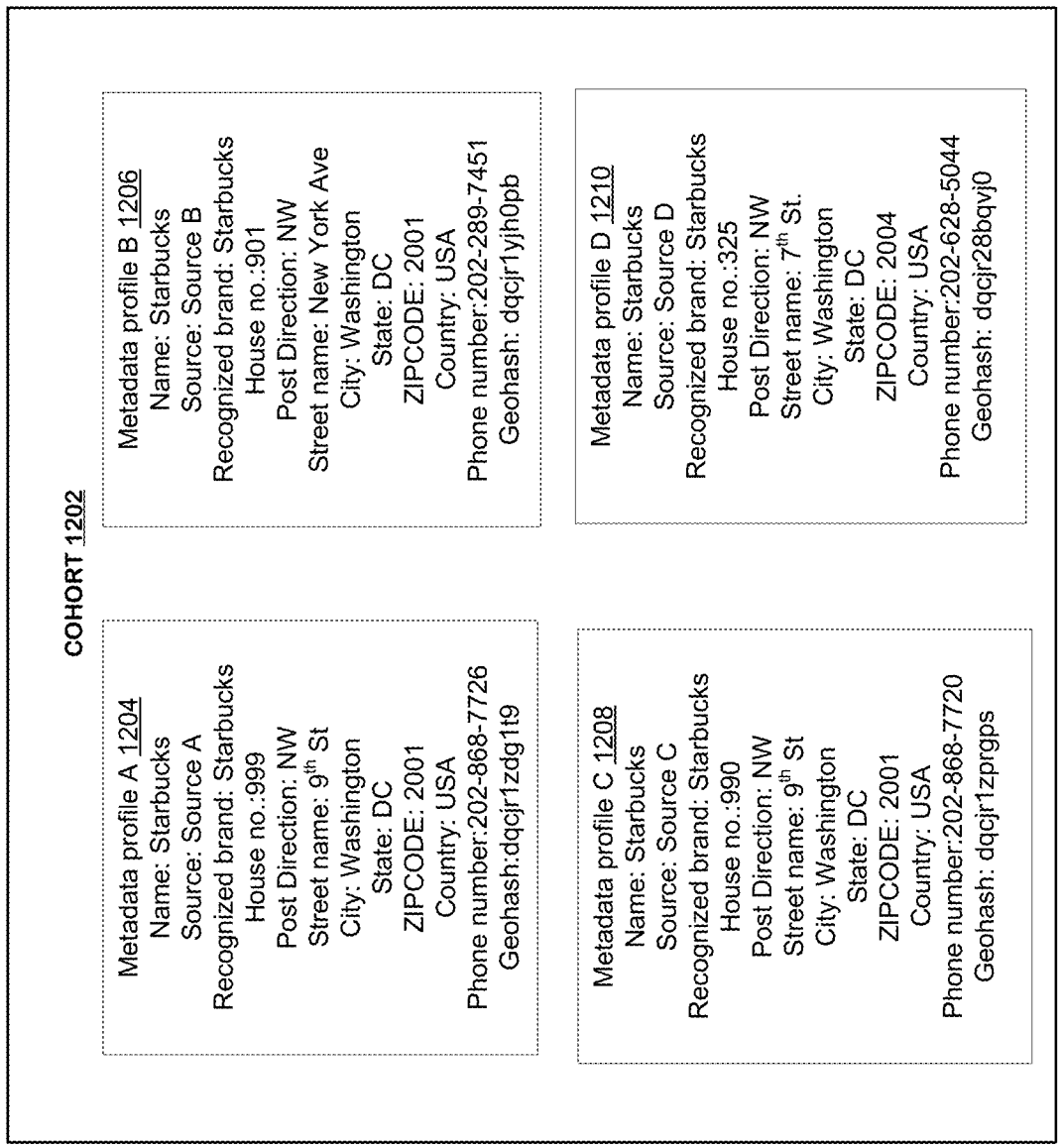
FIG. 12A illustrates an example cohort.

FIG. 12A illustrates an example cohort 1202 clustered by the clustering module 312. The cohort 1202 includes a metadata profile A 1204 for a Starbucks coffee shop from Source A, a metadata profile B 1206 for a Starbucks coffee shop from Source B, a metadata profile C 1208 for a Starbucks coffee shop from Source C, and a metadata profile D 1210 for a Starbucks coffee shop from Source D. The names of the places in all the metadata profiles are similar. The maximum difference between the zip codes is less than 500 and the places belong to the same city. Additionally, the first five characters of the geohashes of all the metadata profiles in the cohort 1202 match.

The diff generator module 314 performs a pair-wise comparison between the features of the processed metadata profiles in each of the cohort 1104 grouped by the clustering module 312 to generate diff vectors between pairs of processed metadata profiles 1106. The diff vector encodes results of comparison between the features of paired processed metadata profiles. The diff vectors for the paired metadata profiles may include one or more of the following components: (i) a distance between word embeddings generated for names of the places in the paired processed metadata profiles, (ii) a number of intersecting characters in the place names, (iii) a difference between street names respectively identified by canonicalized address fields of the paired processed metadata profiles, (iv) a number of intersecting non-contiguous strings in the canonicalized address fields, (v) a distance between geohash strings respectively identified by the paired processed metadata profiles, (vi) a modified version of Levenshtein distance between the place names, (vii) Jacquard Similarity of canonicalized addresses, and (viii) density and/or sparsity of the brand labels in the vicinity of the places represented by the paired processed metadata profile. In some embodiments, the diff generator module 314 may compute one of the above components of the diff vectors. In some embodiments, the diff generator module 314 may compute all of the above components of the diff vectors. In some embodiments, the diff generator module 314 may compute two or more of the above components of the diff vectors.

The trained classification module 316 processes diff vectors generated for metadata profile pairs in the same cohort 1106, and produces a similarity score for each of the processed metadata profile pairs in the cohort 1108. The similarity score indicates whether the paired metadata profiles represent the same place. In some embodiments, the similarity score is a value between zero and one, and a threshold value of the similarity score is used to classify the paired processed metadata profiles as similar or dissimilar.

The assignment module 318 assigns a common place identifier to those metadata profiles clustered in the same cohort 1110 which are determined to represent the same place based on their similarity scores.

The aggregator module 320 takes as input a list of common place identifiers and produces at least one consistent place for each metadata profile based on the similarity score as an aggregation of the features of the corresponding processed metadata profiles. In some embodiments, the aggregator module 320 generates an elite metadata profile by selecting the most accurate attributes from the set of similar metadata profiles. Each attribute in the metadata profiles may be associated with an accuracy level based on the source that provided the metadata profile. The elite metadata profile comprises values of the features of the similar metadata profiles that originate from highest ranking sources. In some embodiments, the accuracy levels for different attributes from different metadata source are stored in a look-up of a feature-to-source ranking table that ranks metadata sources according to attribute quality. The elite metadata profiles are stored in the deduplicated places database 340. In some embodiments, the elite metadata profiles are stored in conjunction with their corresponding hyper-located places entry in the processed geometry database 322. Therefore, each deduplicated place entry in the deduplicated places database 340 stores information for the adjusted geospatial coordinates of the place and a key to lookup the shape datatypes for the associated block (whether in the same database or separate). The shape datatype can be in the form of Well-Known Text (WKT), GeoJSON or Shapefiles. The shape datatype includes geospatial coordinates of the at least the vertices of the block. In some implementations, the shape data type can further include geospatial coordinates for additional points along the perimeter of the block. The each deduplicated place entry will the most accurate values for the following attributes: a name of the deduplicated place, any recognized brand the deduplicated place is associated with (e.g., Starbucks, Target, etc.), a category of the deduplicated place according to the North American Industry Classification System (NAICS), a street address, a city, a state, a zip code, times of operation, a telephone number and/or a website link.

Figure 12B:
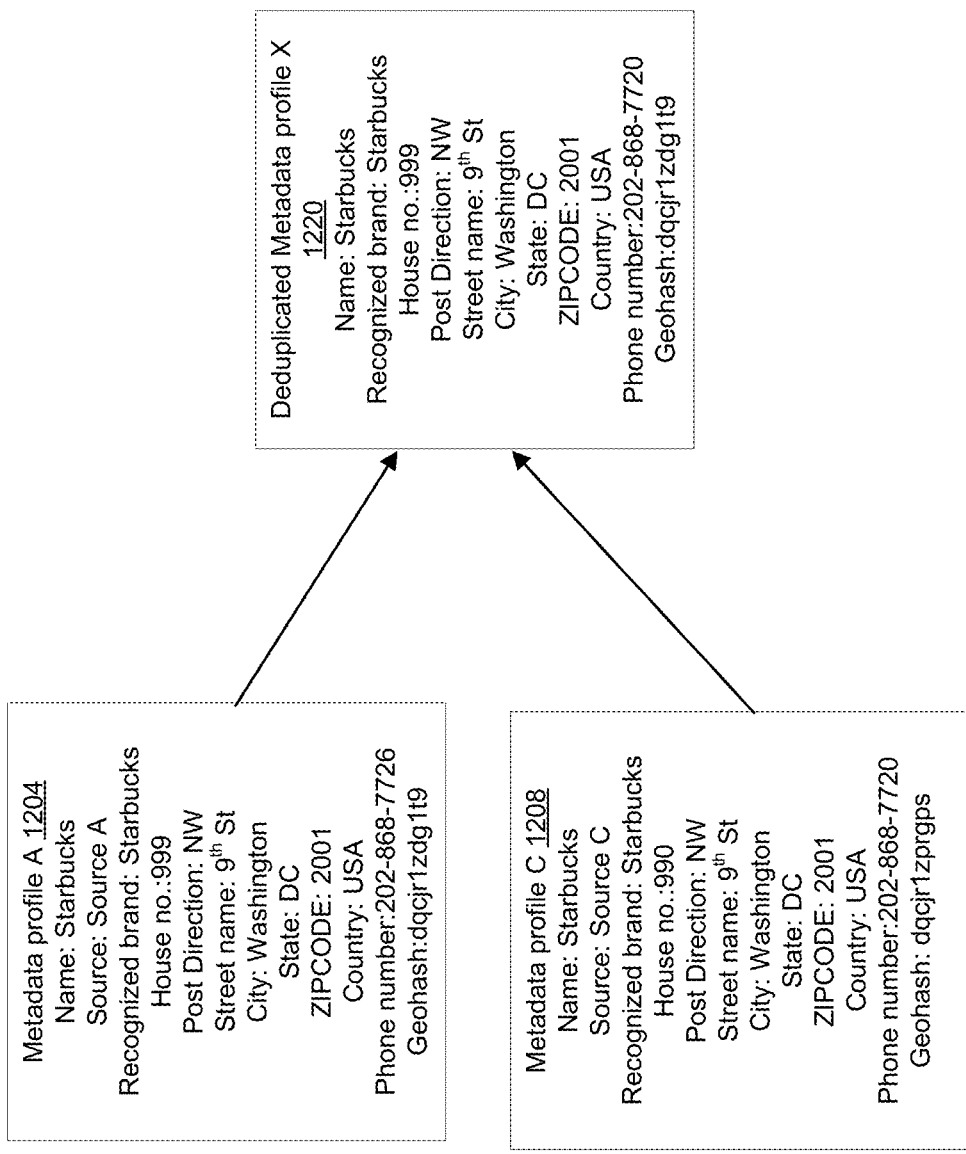
FIG. 12B illustrates an example deduplicated metadata profile.

FIG. 12B illustrates an example deduplicated metadata profile 1220 merged from the metadata profile A 1204 and the metadata profile C 1208 in FIG. 12A. The house number of the deduplicated metadata profile 1220 is selected from the metadata profile A 1204 from Source A while the phone number of the deduplicated metadata profile 1220 is selected from the metadata profile C 1208 from Source C.

Processing of Visitor Data

Figure 13:
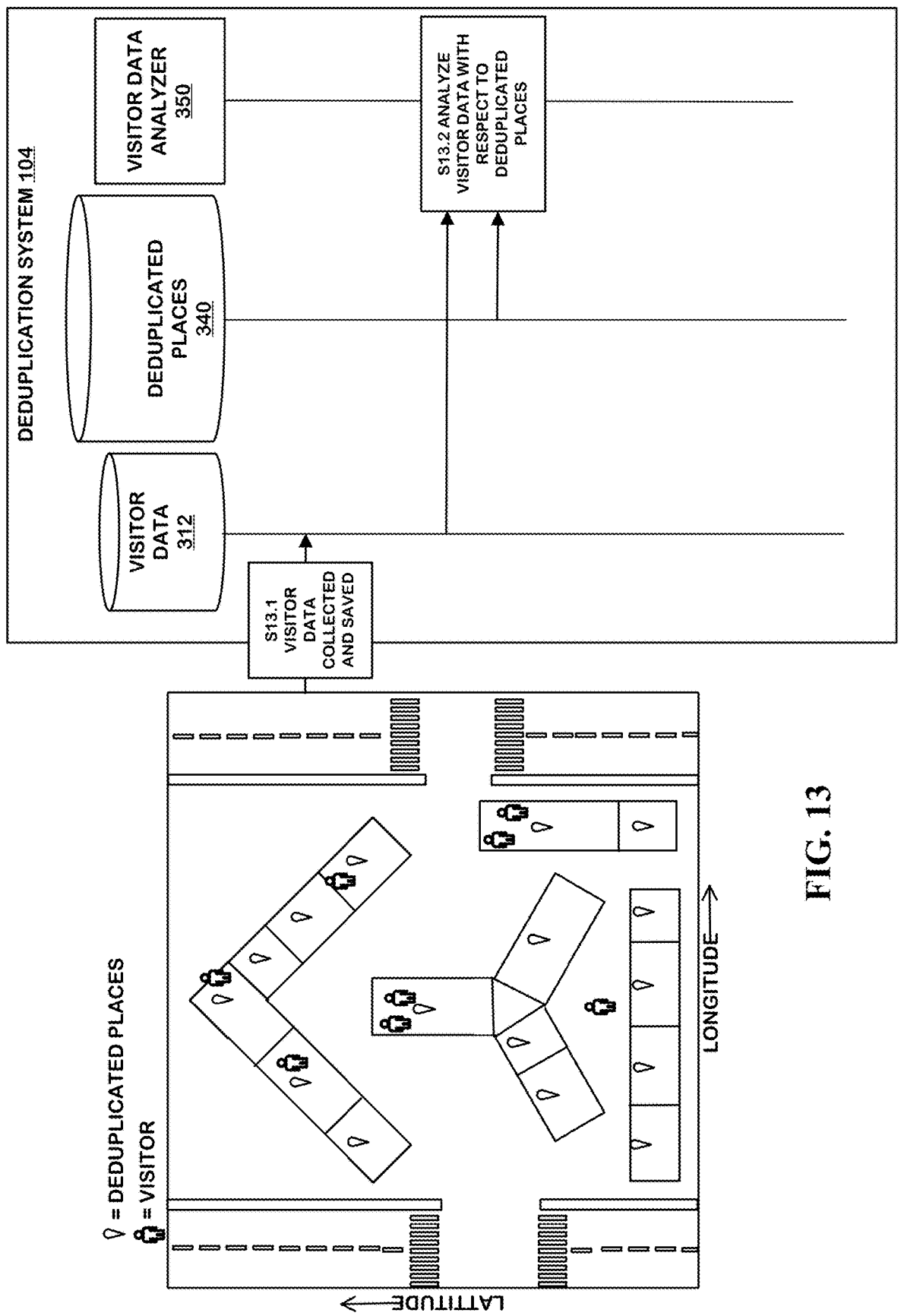
FIG. 13 is a sequence diagram illustrating a representative method of analyzing visitor data in conjunction with the deduplicated places.

FIG. 13 is a sequence diagram illustrating a representative workflow of analyzing visitor data in conjunction with the deduplicated places by the visitor data analyzer 350 in FIG. 3. In some implementations, the actions in the workflow may be performed in different orders and/or with different, fewer or additional actions than those illustrated in FIG. 13. Multiple actions can be combined in some implementations.

The workflow begins at step S13.1 where the visitor data collected by the deduplication system 104 is stored in the visitor data database 312. At step S13.2, the visitor data analyzer 350 analyzes the collected location-specific visitor data from the visitor data database 350 with respect to the adjusted geospatial coordinates and defined blocks and accurate metadata profiles of the deduplicated places stored in the deduplicated places database 340 to discover knowledge patterns about visitors. The visitor data analyzer 350 may determine whether a visitor was inside or outside a certain building structure at a certain time on a certain date. The visitor data analyzer 350 may determine a visitor was within the boundary of the block of a particular place at a certain time on a certain date. The visitor data analyzer 350 may determine how long a visitor stayed within the boundary of the block of a particular place. The visitor data analyzer 350 may determine whether a visitor visited a certain building structure before/after visiting another building structure.

Some Particular Implementations

We describe systems, methods, or article of manufactures for hyper-locating places within a building structure. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to a memory. The memory stores data about building structures collected from one or more building structure sources, and data about places collected from one or more places-of-interest sources. The memory is further loaded with computer instructions to access metadata profiles representing a plurality of places, with multiple metadata profiles representing a same place, and each metadata profile generated by a respective metadata source and identifying place attributes, including a place name, a place category identifier, a place area, a place address, and a place contact number of a corresponding place; apply a heuristics-based string analysis to place names, place category identifiers, and place areas of the metadata profiles to assign a brand label to each metadata profile, and apply regular expression-based canonicalizations to place addresses and place contact numbers of the metadata profile to generate canonicalized address fields and canonicalized contact number fields; generate geohash strings based on the canonicalized address fields, and generates word embeddings for the place names; store in memory, as features of respective metadata profiles, the word embeddings of the place names, the place category identifiers, brand labels, the canonicalized address fields, the canonicalized contact number fields, and the geohash strings; cluster the metadata profiles into cohorts based on applying one or more blocking conditions to the features; pair-wise compare the features of the metadata profiles clustered in a same cohort to generate a diff vector which encodes results of comparison between the features of paired metadata profiles; process diff vectors generated for metadata profile pairs in the same cohort and produce a similarity score for each metadata profile pair which indicates whether paired metadata profiles represent a same place; assign a common place identifier to those metadata profiles clustered in the same cohort which are determined to represent the same place based on their similarity scores; and take as input a list of common place identifiers and produce at least one consistent place for each metadata profile based on the similarity score as an aggregation of the features of the corresponding metadata profile.

In some implementations, the heuristics-based string analysis further includes: comparing the place names to known aliases of a set of selected brands; comparing the place category identifiers to known brand categories; and comparing the place areas to average area bounds observed for the set of selected brands and for the known brand categories.

In some implementations, the system is further configured to remove from the place names known stop words that are linked to respective place category identifiers.

In some implementations, the canonicalized address fields include at least one of a street name, a street number, a pre-directional, a post-directional, a street type, a unit designator, a city name, a state name identifier, a primary zip code, a plus-four zipcode, and a country name identifier.

In some implementations, the geohash strings are generated by: using at least one of centroids of the place, the canonicalized address fields, including applying a waterfall analysis that starts with the centroid, if available, then the plus-four zipcode and continues with the primary zipcode, the city name, the state name identifier, and the country name; and generating the geohash strings based on the above.

In some implementations, the block conditions require at least one of matches between brand labels for a certain number of prefixes of geohash strings, Jaccard Similarity above a threshold, and matches between place category identifiers for a certain number of prefixes of geohash strings.

In some implementations, the system is further configured to: generate an elite metadata profile from each set of similar metadata profiles by including in the elite metadata profile those values of the features of the similar metadata profiles that originate from highest ranking sources, as determined based on a look-up of a feature-to-source ranking table that ranks metadata sources according to feature quality; and assign the common place identifier to the elite metadata profile.

In some implementations, the diff vector for the paired metadata profiles includes a distance between word embeddings generated for place names respectively identified by the paired metadata profiles, a number of intersecting characters in the place names, a difference between street numbers respectively identified by canonicalized address fields of the paired metadata profiles, a number of intersecting non-contiguous strings in the canonicalized address fields, a distance between geohash strings respectively identified by the paired metadata profiles, a modified version of Levenshtein distance between the place names, Jaccard Similarity of canonicalized addresses, and density and/or sparsity of the brand labels.

In some implementations, the canonicalized contact number fields include at least one of a country code, an area code, a phone number, and an extension.

In some implementations, each metadata profile further identifies additional place attributes, including at least one of place open hours information, a place website unified resource locator (abbreviated URL), a place email, name of the metadata source, description of the place, name of the brand, name of parent brands of the place, a place subcategory identifier, and a place North American Industry Classification System (abbreviated NAICS) code of the corresponding place, and the feature generator module is further configured to store in the memory, as the features of the metadata profiles, the place open hours information, the place website URL, the name of the metadata source, the description of the place, the name of the brand, the name of the parent brands of the place, the place email, the place subcategory identifier, and the place NAICS code of the corresponding place.

In some implementations, the common place identifier is a unique string generated from a combination of a place name and a place website URL identified by at least one of similar metadata profiles in the set.

In some implementations, the similarity score is a value between zero and one, and a threshold value of the similarity score is used to classify the paired metadata profiles as similar or dissimilar.

In some implementations, a classification module, such as an extreme gradient boosted tree (XGBoost), processes the diff vectors.

In some implementations, a classification module, such as a recurrent neural network (RNN), processes the diff vectors.

In some implementations, the classification module is trained on a training set of at least a hundred thousand examples of paired metadata profiles using a backpropagation-based gradient update technique.

In some implementations, the word embeddings are embedded in a high-dimensional embedding space.

In some implementations, the high-dimensional embedding space is at least one of word2vec and GloVe.

In some implementations, the system further configured to apply the heuristics-based string analysis to canonicalize the place names using expression-based canonicalizations to generate canonicalized place names.

In some implementations, the system further configured to, prior to the canonicalization, normalize the place names by at least one of: removing non-UTF-8 characters, trimming multiple spaces, and correcting spelling mistakes.

This system implementation and other systems disclosed optionally include one or more of the following features. The system can also include features described in connection with the methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Other implementations may include a non-transitory computer readable storage medium storing instructions executable by a processor to perform functions of the system described above. Yet another implementation may include computer-implemented method performing the functions of the system described above.

The computer-implemented method implementation of the technology disclosed includes accessing metadata profiles representing a plurality of places, with multiple metadata profiles representing a same place, and each metadata profile generated by a respective metadata source and identifying place attributes, including a place name, a place category identifier, a place area, a place address, and a place contact number of a corresponding place; applying a heuristics-based string analysis to place names, place category identifiers, and place areas of the metadata profiles to assign a brand label to each metadata profile, and applying regular expression-based canonicalizations to place addresses and place contact numbers of the metadata profile to generate canonicalized address fields and canonicalized contact number fields; generating geohash strings based on the canonicalized address fields, and generating word embeddings for the place names; storing in memory, as features of respective metadata profiles, the word embeddings of the place names, the place category identifiers, brand labels, the canonicalized address fields, the canonicalized contact number fields, and the geohash strings; clustering the metadata profiles into cohorts based on applying one or more blocking conditions to the features; pair-wise comparing the features of the metadata profiles clustered in a same cohort to generate a diff vector which encodes results of comparison between the features of paired metadata profiles; processing diff vectors generated for metadata profile pairs in the same cohort and produce a similarity score for each metadata profile pair which indicates whether paired metadata profiles represent a same place; assigning a common place identifier to those metadata profiles clustered in the same cohort which are determined to represent the same place based on their similarity scores; and taking as input a list of common place identifiers and producing at least one consistent place for each metadata profile based on the similarity score as an aggregation of the features of the corresponding metadata profile.

In some implementations, the heuristics-based string analysis further includes: comparing the place names to known aliases of a set of selected brands; comparing the place category identifiers to known brand categories; and comparing the place areas to average area bounds observed for the set of selected brands and for the known brand categories.

In some implementations, the computer-implemented method further comprises removing from the place names known stop words that are linked to respective place category identifiers.

In some implementations, the canonicalized address fields include at least one of a street name, a street number, a pre-directional, a post-directional, a street type, a unit designator, a city name, a state name identifier, a primary zipcode, a plus-four zipcode, and a country name identifier.

In some implementations, the geohash strings are generated by: using at least one of centroids of the place, the canonicalized address fields, including applying a waterfall analysis that starts with the centroid, if available, then the plus-four zipcode and continues with the primary zipcode, the city name, the state name identifier, and the country name; and generating the geohash strings based on the above.

In some implementations, the block conditions require at least one of matches between brand labels for a certain number of prefixes of geohash strings, Jaccard Similarity above a threshold, and matches between place category identifiers for a certain number of prefixes of geohash strings.

In some implementations, the computer-implemented method further comprises generating an elite metadata profile from each set of similar metadata profiles by including in the elite metadata profile those values of the features of the similar metadata profiles that originate from highest ranking sources, as determined based on a look-up of a feature-to-source ranking table that ranks metadata sources according to feature quality; and assigning the common place identifier to the elite metadata profile.

In some implementations, the diff vector for the paired metadata profiles includes a distance between word embeddings generated for place names respectively identified by the paired metadata profiles, a number of intersecting characters in the place names, a difference between street numbers respectively identified by canonicalized address fields of the paired metadata profiles, a number of intersecting non-contiguous strings in the canonicalized address fields, a distance between geohash strings respectively identified by the paired metadata profiles, a modified version of Levenshtein distance between the place names, Jacquard Similarity of canonicalized addresses, and density and/or sparsity of the brand labels.

In some implementations, the canonicalized contact number fields include at least one of a country code, an area code, a phone number, and an extension.

In some implementations, each metadata profile further identifies additional place attributes, including at least one of place open hours information, a place website unified resource locator (abbreviated URL), a place email, name of the metadata source, description of the place, name of the brand, name of parent brands of the place, a place subcategory identifier, and a place North American Industry Classification System (abbreviated NAICS) code of the corresponding place, and the feature generator module is further configured to store in the memory, as the features of the metadata profiles, the place open hours information, the place website URL, the name of the metadata source, the description of the place, the name of the brand, the name of the parent brands of the place, the place email, the place subcategory identifier, and the place NAICS code of the corresponding place.

In some implementations, the common place identifier is a unique string generated from a combination of a place name and a place website URL identified by at least one of similar metadata profiles in the set.

In some implementations, the similarity score is a value between zero and one, and a threshold value of the similarity score is used to classify the paired metadata profiles as similar or dissimilar.

In some implementations, a classification module, such as an extreme gradient boosted tree (XGBoost), processes the diff vectors.

In some implementations, a classification module, such as a recurrent neural network (RNN), processes the diff vectors.

In some implementations, the classification module is trained on a training set of at least a hundred thousand examples of paired metadata profiles using a backpropagation-based gradient update technique.

In some implementations, the word embeddings are embedded in a high-dimensional embedding space.

In some implementations, the high-dimensional embedding space is at least one of word2vec and GloVe.

In some implementations, the computer-implemented method further comprises applying the heuristics-based string analysis to canonicalize the place names using expression-based canonicalizations to generate canonicalized place names.

In some implementations, the computer-implemented method further comprises, prior to the canonicalization, normalizing the place names by at least one of: removing non-UTF-8 characters, trimming multiple spaces, and correcting spelling mistakes.

Computer readable media (CRM) implementations of the technology disclosed include a non-transitory computer readable storage medium impressed with computer program instructions, when executed on a processor, implement the computer-implemented method described above.

Each of the features discussed in this particular implementation section for the first system implementation applies equally to this system implementation. As indicated above, all the system features are not repeated here and should be considered repeated by reference.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, and an HBase™ or DynamoDB™ compatible non-relational database implementation.

The technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™, Apache Spark™, Apache Kafka™ Apache Flink™, Truviso™, IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

A number of workflows illustrating logic are described herein. The logic can be implemented using processors programmed using computer programs stored in memory accessible to the computer systems and executable by the processors. With all workflows herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied. Furthermore, it will be appreciated that the workflows herein show only steps that are pertinent to an understanding of the invention, and it will be understood that numerous additional steps for accomplishing other functions can be performed before, after and between those shown.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing descriptions, it will be evident to a person skilled in the art that various modifications may be made within the scope of the invention.

The foregoing description of preferred implementations of the present invention has been provided for the purposes of illustration and description. It is not intended to be exhaustive or to limit the invention to the precise forms disclosed. Obviously, many modifications and variations will be apparent to practitioners skilled in this art. In addition, any and all variations described, suggested or incorporated by reference herein with respect to any one implementation are also to be considered taught with respect to all other implementations. The implementations described herein were chosen and described in order to best explain the principles of the invention and its practical application, thereby enabling others skilled in the art to understand the invention for various implementations and with various modifications as are suited to the particular use contemplated. It is intended that the scope of the invention be defined by the following claims and their equivalents.

We claim as follows:

1. A computer-implemented system for deduplicating metadata about places, comprising:
    a feature generator module configured to
        access memory containing metadata profiles representing a plurality of places, with multiple metadata profiles representing a same place, and each metadata profile generated by a respective metadata source and identifying place attributes, including a place name, a place category identifier, a place area, a place address, and a place contact number of a corresponding place,
        apply a heuristics-based string analysis using a processor to place names, place category identifiers, and place areas of the metadata profiles to assign a brand label to each metadata profile, and apply regular expression-based canonicalizations to place addresses and place contact numbers of the metadata profile to generate canonicalized address fields and canonicalized contact number fields,
        using the processor to generate geohash strings based on the canonicalized address fields, and generate word embeddings for the place names, and
        store in the memory, as features of respective metadata profiles, the word embeddings of the place names, the place category identifiers, brand labels, the canonicalized address fields, the canonicalized contact number fields, and the geohash strings;
    a clustering module, running on the processor, that clusters the metadata profiles into cohorts based on applying one or more blocking conditions to the features including the word embeddings of the place names, the place category identifiers, brand labels, the canonicalized address fields, the canonicalized contact number fields, and the geohash strings;
    a diff generator module that pair-wise compares the features of the metadata profiles clustered in a same cohort to generate a diff vector which encodes results of comparison between the features of paired metadata profiles;
    a classification module, running on the processor, that processes diff vectors generated for metadata profile pairs in the same cohort and produces a similarity score for each metadata profile pair which indicates whether paired metadata profiles represent a same place;
    an assignment module, running on the processor, that assigns a common place identifier to those metadata profiles clustered in the same cohort which are determined to represent the same place based on their similarity scores; and
    an aggregator module, running on the processor, that takes as input a list of common place identifiers and produces at least one consistent place for each metadata profile based on the similarity score as an aggregation of the features of the corresponding metadata profile.

2. The system of claim 1, wherein the heuristics-based string analysis further includes:

comparing the place names to known aliases of a set of selected brands;
comparing the place category identifiers to known brand categories; and
comparing the place areas to average area bounds observed for the set of selected brands and for the known brand categories.

3. The system of claim 2, further configured to remove from the place names known stop words that are linked to respective place category identifiers.

4. The system of claim 1, wherein the canonicalized address fields include at least one of a street name, a pre-directional, a post-directional, a street type, a unit designator, a city name, a state name identifier, a primary zipcode, a plus-four zipcode, and a country name identifier.

5. The system of claim 4, wherein the geohash strings are generated by:
using at least one of centroids of the place, the canonicalized address fields, including applying a waterfall analysis that starts with the centroid, if available, then the plus-four zipcode and continues with the primary zipcode, the city name, the state name identifier, and the country name; and
generating the geohash strings based on the above.

6. The system of claim 5, wherein the block conditions require at least one of matches between brand labels for a certain number of prefixes of geohash strings, Jaccard Similarity above a threshold, and matches between place category identifiers for a certain number of prefixes of geohash strings.

7. The system of claim 1, further configured to:
generate an elite metadata profile from each set of similar metadata profiles by including in the elite metadata profile those values of the features of the similar metadata profiles that originate from highest ranking sources, as determined based on a look-up of a feature-to-source ranking table that ranks metadata sources according to feature quality; and
assign the common place identifier to the elite metadata profile.

8. The system of claim 1, wherein the diff vector for the paired metadata profiles includes
a distance between word embeddings generated for place names respectively identified by the paired metadata profiles,
a number of intersecting characters in the place names,
a difference between street numbers respectively identified by canonicalized address fields of the paired metadata profiles,
a number of intersecting non-contiguous strings in the canonicalized address fields,
a distance between geohash strings respectively identified by the paired metadata profiles,
a modified version of Levenshtein distance between the place names,
Jacquard Similarity of canonicalized addresses, and
density and/or sparsity of the brand labels.

9. The system of claim 1, wherein the canonicalized contact number fields include at least one of a country code, an area code, a phone number, and an extension.

10. The system of claim 1, wherein each metadata profile further identifies additional place attributes, including at least one of place open hours information, a place website unified resource locator (abbreviated URL), a place email, name of the metadata source, description of the place, name of the brand, name of parent brands of the place, a place subcategory identifier, and a place North American Industry Classification System (abbreviated NAICS) code of the corresponding place, and
wherein the feature generator module is further configured to store in the memory, as the features of the metadata profiles, the place open hours information, the place website URL, the name of the metadata source, the description of the place, the name of the brand, the name of the parent brands of the place, the place email, the place subcategory identifier, and the place NAICS code of the corresponding place.

11. The system of claim 1, wherein the common place identifier is a unique string generated from a combination of a place name and a place website URL identified by at least one of similar metadata profiles in the set.

12. The system of claim 1, wherein the similarity score is a value between zero and one, and
wherein a threshold value of the similarity score is used to classify the paired metadata profiles as similar or dissimilar.

13. The system of claim 1, wherein the classification module is an extreme gradient boosted tree (XGBoost).

14. The system of claim 1, wherein the classification module is a recurrent neural network (RNN).

15. The system of claim 1, wherein the classification module is trained on a training set of at least a hundred thousand examples of paired metadata profiles using a backpropagation-based gradient update technique.

16. The system of claim 1, wherein the word embeddings are embedded in a high-dimensional embedding space.

17. The system of claim 16, wherein the high-dimensional embedding space is at least one of word2vec and GloVe.

18. The system of claim 1, prior to generating the features, further configured to apply the heuristics-based string analysis to canonicalize the place names using expression-based canonicalizations to generate canonicalized place names.

19. The system of claim 18, prior to generating the features, further configured to, prior to the canonicalization, normalize the place names by at least one of
removing non-UTF-8 characters,
trimming multiple spaces, and
correcting spelling mistakes.

* * * * *